(12) United States Patent
Ackaouy et al.

(10) Patent No.: US 7,552,223 B1
(45) Date of Patent: Jun. 23, 2009

(54) APPARATUS AND METHOD FOR DATA CONSISTENCY IN A PROXY CACHE

(75) Inventors: Emmanuel Ackaouy, San Francisco, CA (US); Brian Quirion, San Jose, CA (US); David Grunwald, Santa Clara, CA (US); Ashish Prakash, Morrisville, NC (US); James Voll, Palo Alto, CA (US); Paul Eastham, Mountain View, CA (US); Kartik Ayyar, Santa Clara, CA (US); Szu-wen Kuo, Milpitas, CA (US)

(73) Assignee: Netapp, Inc., Sunnyvale, CA (US)

( * ) Notice: Subject to any disclaimer, the term of this patent is extended or adjusted under 35 U.S.C. 154(b) by 938 days.

(21) Appl. No.: 10/423,477

(22) Filed: Apr. 25, 2003

Related U.S. Application Data

(63) Continuation-in-part of application No. 10/245,798, filed on Sep. 16, 2002, now Pat. No. 7,284,030.

(51) Int. Cl.
*G06F 15/16* (2006.01)

(52) U.S. Cl. .................. 709/229; 709/213; 709/217; 711/141; 707/10

(58) Field of Classification Search .......... 709/213, 709/217, 229; 711/141; 707/10
See application file for complete search history.

(56) References Cited

U.S. PATENT DOCUMENTS

| 5,535,375 A | 7/1996 | Eshel et al. |
|---|---|---|
| 5,864,852 A | 1/1999 | Luotonen |
| 5,893,140 A | 4/1999 | Vahalia et al. |
| 5,907,678 A | 5/1999 | Housel, III et al. |
| 5,924,116 A | 7/1999 | Aggarwal et al. |
| 5,946,685 A * | 8/1999 | Cramer et al. ............ 707/10 |
| 5,946,690 A | 8/1999 | Pitts |
| 5,950,205 A | 9/1999 | Aviani, Jr. |

(Continued)

FOREIGN PATENT DOCUMENTS

WO   WO 02/35799   5/2002

(Continued)

OTHER PUBLICATIONS

"Exploiting Metadata of Absent Objects for Proxy Cache Consistency" by J. Kim, et al. IEICE Trans. Comms., vol. E84-B, No. 5, May 2001. pp. 1406-1412.

(Continued)

*Primary Examiner*—Jinsong Hu
(74) *Attorney, Agent, or Firm*—Perkins Coie LLP

(57) ABSTRACT

In an embodiment, a method to provide data consistency in a storage system, includes: providing, by a server to a proxy cache, a lock associated with a delegated file in the server; in response to a write request from a client, modifying data in a cached copy of the delegated file in the proxy cache; revoking, by the server, the lock associated with the delegated file, in response to a request from another device to access the delegated file so that the delegated file is now a formerly delegated file; and writing the modified data to the formerly delegated file in the server to update the formerly delegated file; and permitting access to the formerly delegated file by the another device.

35 Claims, 14 Drawing Sheets

U.S. PATENT DOCUMENTS

| | | | |
|---|---|---|---|
| 5,987,506 A * | 11/1999 | Carter et al. | 709/213 |
| 5,991,810 A | 11/1999 | Shapiro et al. | |
| 6,065,058 A | 5/2000 | Hailpern et al. | |
| 6,085,193 A | 7/2000 | Malkin et al. | |
| 6,085,234 A * | 7/2000 | Pitts et al. | 709/217 |
| 6,128,623 A * | 10/2000 | Mattis et al. | 707/103 R |
| 6,167,446 A | 12/2000 | Lister et al. | |
| 6,178,461 B1 | 1/2001 | Chan et al. | |
| 6,182,111 B1 | 1/2001 | Inohara et al. | |
| 6,230,160 B1 | 5/2001 | Chan et al. | |
| 6,237,060 B1 | 5/2001 | Shilts et al. | |
| 6,282,580 B1 | 8/2001 | Chang | |
| 6,292,835 B1 | 9/2001 | Huang et al. | |
| 6,311,216 B1 | 10/2001 | Smith et al. | |
| 6,370,620 B1 | 4/2002 | Wu et al. | |
| 6,438,652 B1 | 8/2002 | Jordan et al. | |
| 6,442,651 B2 | 8/2002 | Crow et al. | |
| 6,463,508 B1 | 10/2002 | Wolf et al. | |
| 6,505,241 B2 | 1/2003 | Pitts | |
| 6,542,964 B1 | 4/2003 | Scharber | |
| 6,553,411 B1 | 4/2003 | Dias et al. | |
| 6,578,113 B2 | 6/2003 | Krishnamurthy et al. | |
| 6,598,121 B2 | 7/2003 | Challenger et al. | |
| 6,643,672 B1 | 11/2003 | Lebel | |
| 6,658,462 B1 | 12/2003 | Dutta | |
| 6,658,463 B1 | 12/2003 | Dillon et al. | |
| 6,665,705 B1 | 12/2003 | Daniels-Barnes et al. | |
| 6,675,214 B2 | 1/2004 | Stewart et al. | |
| 6,741,970 B2 | 5/2004 | Smith et al. | |
| 6,751,608 B1 | 6/2004 | Cohen et al. | |
| 6,801,927 B1 | 10/2004 | Smith et al. | |
| 6,823,377 B1 | 11/2004 | Wu et al. | |
| 6,886,077 B2 | 4/2005 | Cuomo et al. | |
| 6,907,501 B2 | 6/2005 | Tariq et al. | |
| 6,952,736 B1 * | 10/2005 | Westbrook | 709/229 |
| 7,003,630 B1 * | 2/2006 | Kissell | 711/141 |
| 7,103,794 B2 | 9/2006 | Malcolm et al. | |
| 7,159,013 B2 | 1/2007 | Cudd et al. | |
| 2001/0000083 A1 | 3/2001 | Crow et al. | |
| 2002/0004846 A1 | 1/2002 | Garcia-Luna-Aceves | |
| 2002/0004917 A1 | 1/2002 | Malcolm et al. | |
| 2002/0026511 A1 | 2/2002 | Garcia-Luna-Aceves | |
| 2002/0026560 A1 | 2/2002 | Jordan et al. | |
| 2002/0046266 A1 | 4/2002 | Muralidhar et al. | |
| 2002/0118835 A1 | 8/2002 | Uemura | |
| 2003/0004998 A1 | 1/2003 | Datta | |
| 2003/0065874 A1 | 4/2003 | Marron et al. | |
| 2003/0120867 A1 | 6/2003 | Cuomo et al. | |
| 2003/0145112 A1 | 7/2003 | Keller et al. | |
| 2003/0149737 A1 | 8/2003 | Lambert et al. | |
| 2003/0163731 A1 | 8/2003 | Wigley et al. | |
| 2003/0172145 A1 | 9/2003 | Nguyen | |
| 2003/0233423 A1 | 12/2003 | Dilley et al. | |
| 2004/0044740 A1 | 3/2004 | Cudd et al. | |

FOREIGN PATENT DOCUMENTS

| | | | |
|---|---|---|---|
| WO | WO 02/42874 A2 | 5/2002 | |

OTHER PUBLICATIONS

"Web Cache Coherence" by A. Dingle, et al. Computer Networks and ISDN Systems, No. Holland Publishing. Amsterdam, NL, vol. 28, No. 11, May 1996. pp. 907-920.

"A Scalable Web Cache Consistency Architecture" by H. Yu, et al. Computer Communication Review, Asso. for Computer Machinery, NY, US. vol. 29, No. 4, Oct. 1999. pp. 163-174.

"Design and Implementation of a Portable and Extensible FTP to NFS Gateway" by D. Gupta, et al. Dept. of Comp. Science & Eng., India Inst. of Technology. Total pages: 6.

"Multiprotocol Data Access: NFS, CIFS, and HTTP" by Andy Watson, et al., Tech. Report# 3014, Network Appliance, Inc. Total pages: 25.

Dingle et al. "Web cache coherence" Computer Networks & ISDN Syst. No. Holland Pub. Amsterdam, NL. vol. 28 No. 11 (May 1996) pp. 907-920.

Gupta, et al. "Design and implementation of a portable and extensible FTP to NFS gateway." Dept. Comp. Science & Tech. India Inst. Techn. 6 pp.

Kim, "Exploiting metadata of absent objects for proxy cache consistency." IEICE Trans. Comms. vol. E84-B. No. 5 (May 2001) pp. 1405-1412.

Watson, et al. "Multiprotocol data access: NFS, CIFS and HTTP." Network Appliance Inc. 25 pp.

Yu. "A scalable web cache consistency architecture." Computer Communication Review. Assn. for Computer Machinery. NY. Vo.. 29. No. 40 (Oct. 1999) pp. 163-174.

* cited by examiner

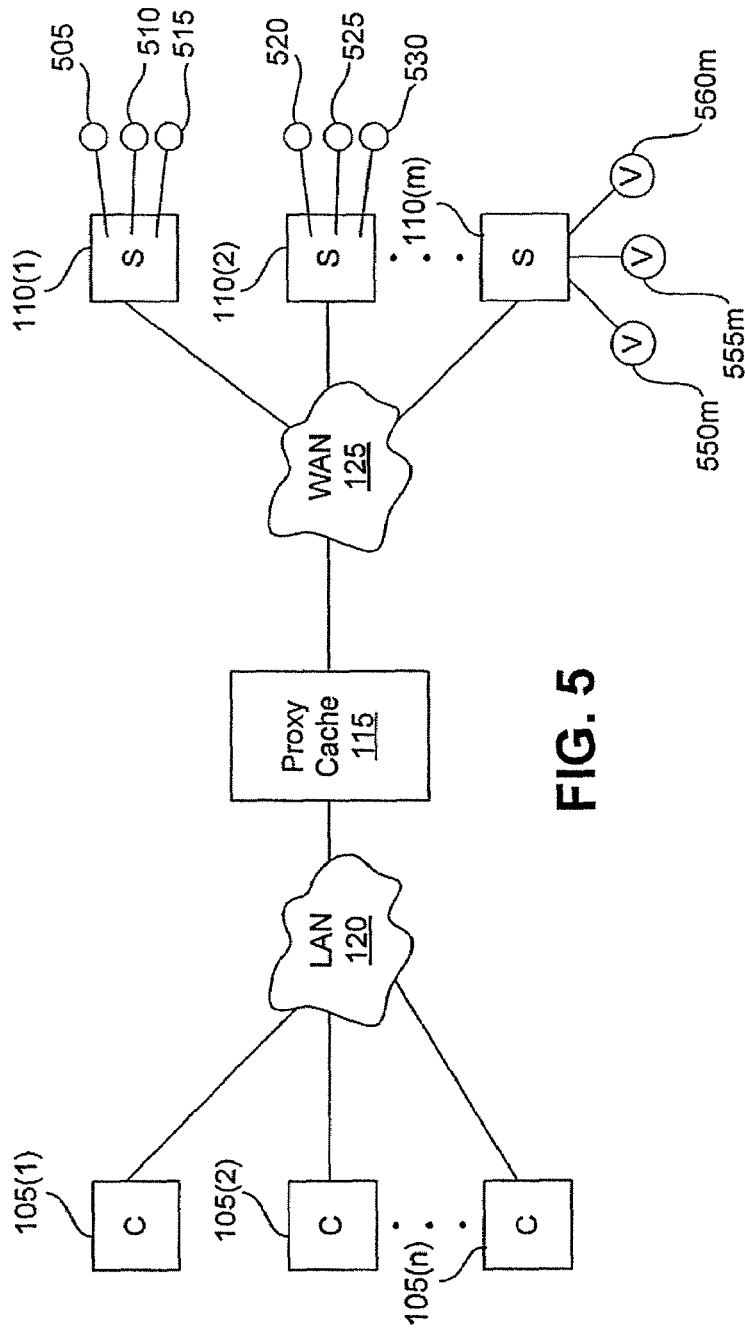

APPARATUS AND METHOD FOR DATA CONSISTENCY IN A PROXY CACHE

CROSS-REFERENCE TO RELATED APPLICATION

This application is a continuation-in-part of and claims the benefit of U.S. patent application Ser. No. 10/245,798, by Emmanuel Ackaouy et al., filed Sep. 16, 2002, now U.S. Pat. No. 7,284,030, and entitled "APPARATUS AND METHOD FOR PROCESSING DATA IN A NETWORK". Application Ser. No. 10/245,798, now Pat. No. 7,248,030 is hereby fully incorporated herein by reference.

TECHNICAL FIELD

Embodiments of the present invention relate generally to computer networks. More particularly, embodiments of the present invention relate generally to file systems and storage devices.

BACKGROUND

Large organizations are geographically distributed. They may have a few large central sites that have high-speed local area networks (LANs) where local data can be consolidated into a central area or system. However, large organizations may also have smaller remote offices, branch offices, or/and other edge locations that have lower bandwidth and higher latency connectivity to the centralized data repositories. The edge locations may not have information technology (IT) staffs to service local data needs such as, for example, backing up the servers or replacing failing hardware and/or software. Users at remote offices can typically see much poorer performance, reliability, and services from the corporate IT infrastructure than their counterparts at a central site.

Sharing data across large sites is also cumbersome. These sites are usually connected by dedicated high bandwidth links. However, the geographical distances between sites impose latencies that are unacceptable for many applications.

The current solution is to provide a file server (such as a filer from Network Appliance, Inc.) at each edge location and automatically back up the server to a central location over the wide area network (WAN). Read-only data that is shared across sites can be replicated by using asynchronous mirroring. Hypertext Transfer Protocol (HTTP) and streaming traffic can be cached using a network cache such as, for example, the NetCache appliance from Network Appliance, Inc.

Managing file servers at edge locations can be expensive in terms of cost and/or resource. The task of backing up data across WANs requires careful planning and administration. Replicating read-only volumes across WANs is often an overkill. In many cases, only a small percentage of the volume is actually used on a regular basis (e.g., /usr/local/bin). Typically, dynamic data sets (e.g., home directories of a user) cannot be replicated and must be managed independently at each location.

Therefore, the above-described products and approaches are limited to particular capabilities and features and suffer from a number of constraints.

SUMMARY OF EMBODIMENTS OF THE INVENTION

In one embodiment of the invention, a method to provide data consistency in a storage system, includes: providing, by a server to a proxy cache, a lock associated with a delegated file in the server; in response to a write request from a client, modifying data in a cached copy of the delegated file in the proxy cache; revoking, by the server, the lock associated with the delegated file, in response to a request from another device to access the delegated file so that the delegated file is now a formerly delegated file; and writing the modified data to the formerly delegated file in the server to update the formerly delegated file; and permitting access to the formerly delegated file by the another device.

In another embodiment, a method to provide data consistency in a storage system, includes: providing, by a server to a proxy cache, a lock associated with a delegated file in the server; in response to a write request from a client, modifying data in a cached copy of the delegated file in the proxy cache; and writing the modified data to the delegated file in the server to update the delegated file.

In another embodiment, a method to provide data consistency in a storage system, includes: receiving a first request for transmission to a server, in order to access an object; receiving a second request for transmission to the server, in order to access the object; wherein a first version of the object in response to the first request includes a last recorded change (LRC) time value and wherein the second request has a request (RST) time value that indicates when the second request was made; and if a time difference is greater than a pre-selected time value for which the LRC time value for the first version of object is greater than the RST time value when the second request was made by the pre-selected time, then verifying, by the proxy cache, the object in the server.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Embodiments of the present invention are described with reference to the following figures, wherein like reference numerals refer to like parts throughout the various views unless otherwise specified.

FIG. 4 is a block diagram of a file handle.

FIG. 5 is a block diagram illustrating example volumes in each server.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1A:
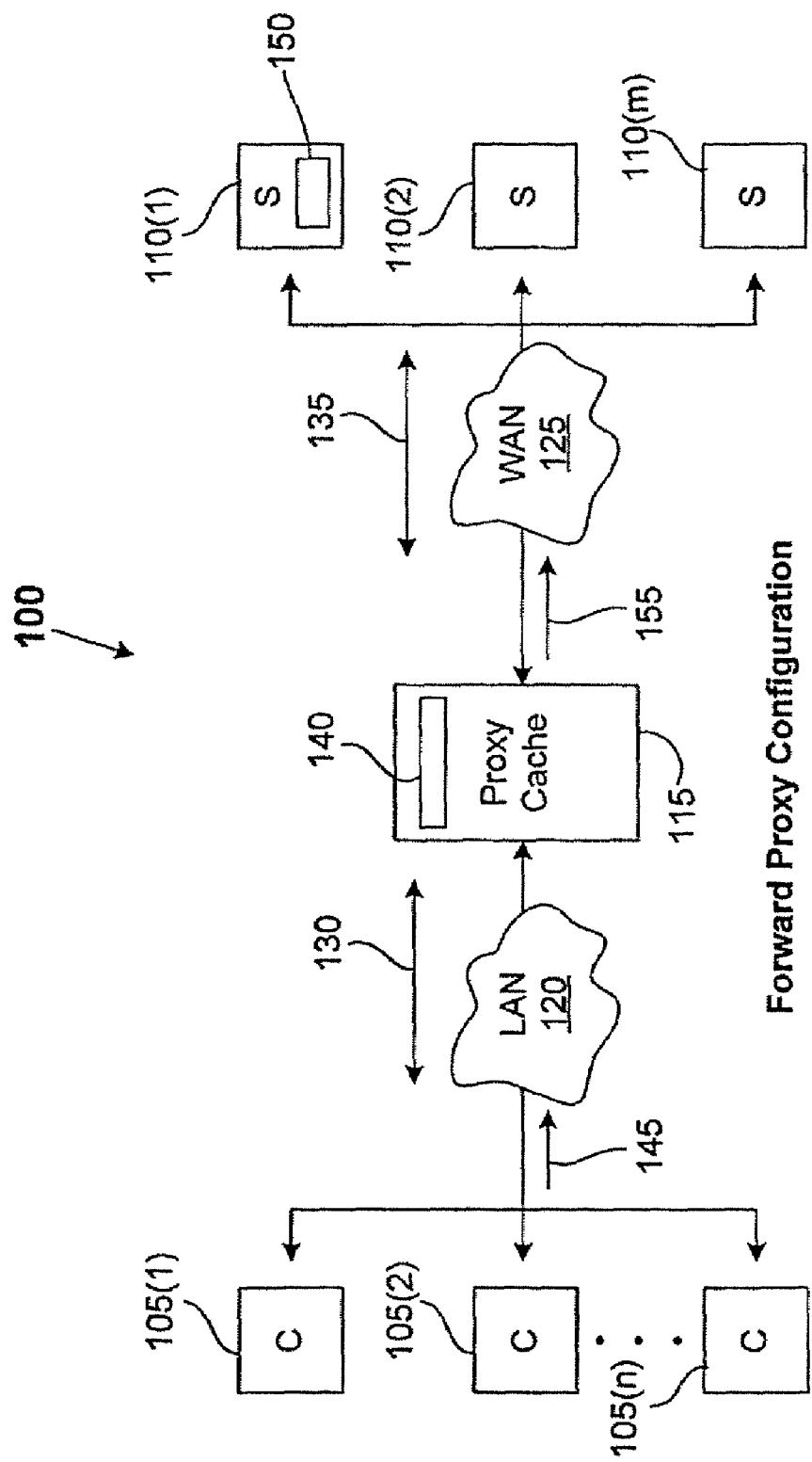
FIG. 1A is a block diagram of an apparatus in accordance with an embodiment of the invention.

FIG. 1A is a block diagram of a network 100, including client devices 105(1) to 105(n), servers 110(1) to 110(m), and a proxy cache (or proxy appliance) 115, with the components forming a forward proxy configuration in accordance with an embodiment of the invention. As described below, another embodiment of the invention provides a network including at least one proxy cache in a reverse proxy configuration. Embodiments of the invention include or provide at least some of the following features, as described below: (1) location independence and consolidation of name space; (2) on-demand sparse consistent replication of data; (3) load balancing; (4) remote disconnected access and modification of data; and/or (5) protocol transformation. These applications of virtualization make it possible to build a distributed storage infrastructure without incurring the prohibitive costs associated with conventional methods.

The above-variables n and m may be any suitable integer value. Thus, the number of client devices (generally referred herein as client(s) 105) and the number of servers (generally referred herein as server(s) 110) may vary. For example, the network 100 may be implemented with only one client device 105 and/or with only one server 110. The client devices 105 may be coupled via local area network (LAN) 120 to the proxy cache 115, while the servers 110 may be coupled via wide area network (WAN) 125 to the proxy cache 115.

The forward proxy configuration in FIG. 1A permits data to be cached on-demand by the proxy cache 115. Thus, on-demand sparse consistent replication of data is permitted by the proxy cache 115. This on-demand caching operation is more efficient than conventional replication techniques and advantageously does not require the special software that is used in conventional replication techniques.

In an embodiment, the proxy cache 115 and client devices 105 can communicate with each other via LAN 120 by use of an open standard protocol 130, such as the Network File System (NFS) protocol. As described below, the open standard protocol 130 may also be other suitable open standard protocols such as the Common Internet File System (CIFS) protocol. The proxy cache 115 and servers 110 can communicate with each other via Wide Area Network (WAN) 125 by use of an open standard protocol 135, such as NFS. By use of an open standard protocol along the WAN 125 and LAN 120, the special software required in conventional approaches is advantageously avoided in an embodiment of the invention. In particular, the clients 105 can now be heterogeneous by use of an open standard protocol such as NFS. In other words, the term heterogeneous clients means that clients from different manufacturers or vendors can be advantageously used. The clients will not require specialized software in order to communicate with the servers 110.

Additionally, the open standard protocol avoids configuration changes that would otherwise be required for the client devices 105 when the proxy cache 115 is installed in the network 100. Thus, a proxy cache 115 permits low overhead and cost with respect to network administration. Also, the proxy cache 115 may be administered or installed from a location remote from a server 110 or a client 105 in the network 100.

Typically, the proxy cache 115 can identify the servers 110 and clients 105 that are coupled to the proxy cache 115 and the particular data files that are in the servers 110.

As an example, if a client 105 requests data and the data is not in the proxy cache 115, then a "cache miss" would occur. On the other hand, if the requested data is in the proxy cache 115, then a "cache hit" would occur. These operations are described in detail below with reference to FIGS. 1B and 1C.

In the event of a cache hit, the proxy cache 115 will transmit the requested data to the requesting client 105. In the event of a cache miss, the proxy cache 115 will request the data from a server 110 and then provide the data to the requesting client 105. The data from the server 110 will be cached as an active data set 140 in the proxy cache 115 and is immediately available to the other clients 105. An active data set is an attribute of clients and their applications, and is cached data with reference for a given time period (or window of time). Thus, the active data set can differ depending on the given time period (e.g., an active data set for a given time period of 2 minutes may differ for an active data set for a given time period of 1 day or 1 week).

The proxy cache 115 permits collaborative sharing of cached copies of data among the clients 105. The collaborative sharing situation assumes that a particular data requested from the server 110 by a client 105 will also be likely requested by at least another client 105.

In an embodiment, the proxy cache 115 will cache an active data set 140, which is a set of recently requested or frequently requested data that has not been flushed from the proxy cache 115. The active data set 140 will be a subset of the data stored in the server(s) 110. When a client device 105 sends a read request 145 in order to read a particular copy 150 of a data file from a server 110, the read request 145 is received by the proxy cache 115 which checks if the particular part (e.g., data block) of that file or folder is cached locally in the proxy cache 115. If the requested particular data file is in the active data set 140, then a cache hit condition occurs, and the proxy cache 115 will transmit the requested data via LAN 120 to the requesting client device 105.

On the other hand, if a data block in the requested file is not stored as part of the active data set, then a cache miss condition occurs. As a result, the proxy cache 115 will send a request 155 to a server 110 to provide a copy of the missing data block in the requested data file.

In an embodiment, the cached file remains as part of the active data set 140, until the file is replaced in the active data set 140 by a suitable replacement strategy (such as, for example, a first-in-first-out management of data or the least recently used, LRU, algorithm). Of course, as described below, other data replacement strategies may be used with respect to management of the active data set 140, in an embodiment of the invention. For example, a file may be designated for permanent storage until a user of the client 105 issues a command to delete (flush) the file from the active data set 140.

Figure 1B:
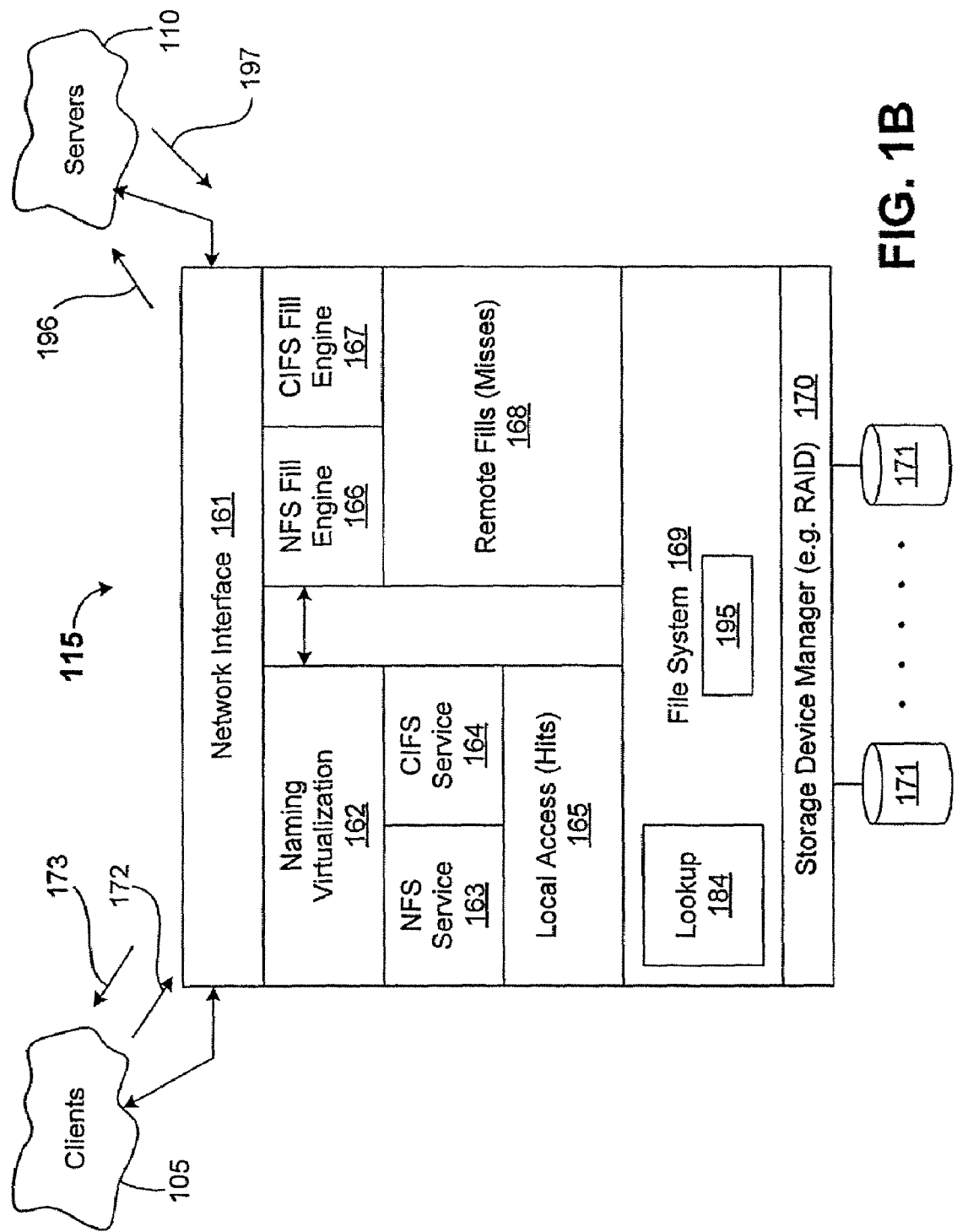
FIG. 1B is a block diagram of a proxy cache in accordance with an embodiment of the invention.

FIG. 1B is a block diagram of a proxy cache 115 in accordance with one embodiment of the invention. The proxy cache 115 includes a network interface 161, a naming virtualization layer 162, an NFS service 163 and/or CIFS service 164 (and/or or other service) for parsing IP-based network traffic (or other types of traffic for fiber channel, storage are network or the like), a local access layer 165, an NFS fill engine 166 and/or CIFS fill engine 167 and/or other suitable types of fill engines, a remote fills layer 168, a file system layer 169 (e.g., write-anywhere-file-layout or WAFL), a storage device manager 170 (such a Redundant Array Of Independent (or Inexpensive) Disks layer, i.e., a RAID layer), and storage disk(s) 171.

The network interface 161 includes components for receiving storage-related service requests from a client 105.

Generally, a file system can logically organize information as a hierarchical structure of directories and files on the storage devices (e.g., disks). Each file (on the disks) may be implemented as a set of disk blocks configured to store information, such as text, whereas the directory may be implemented as a specially-formatted file in which information about other files and directories are stored.

The storage device manager 170 manages the storage devices 171 in a storage system. The storage device manager 170 receives read and write commands from the file system 169 and processes the commands by accordingly accessing the storage system. The storage device manager 170 takes a block's logical address from the file system 169 and translates that logical address to a physical address in one or more storage devices 171 in storage system. In one embodiment, the storage device manager 170 manages storage devices in accordance with RAID (Redundant Array of Independent, or Inexpensive, Disks).

Generally, disk storage is typically implemented as one or more storage "volumes" that is formed by physical storage disks, defining an overall logical arrangement of storage space. Each volume is typically associated with its own file system, and the terms, volume and file system, will generally be used synonymously. The disks within a volume may be typically organized as one or more groups of RAID.

Figure 1C:
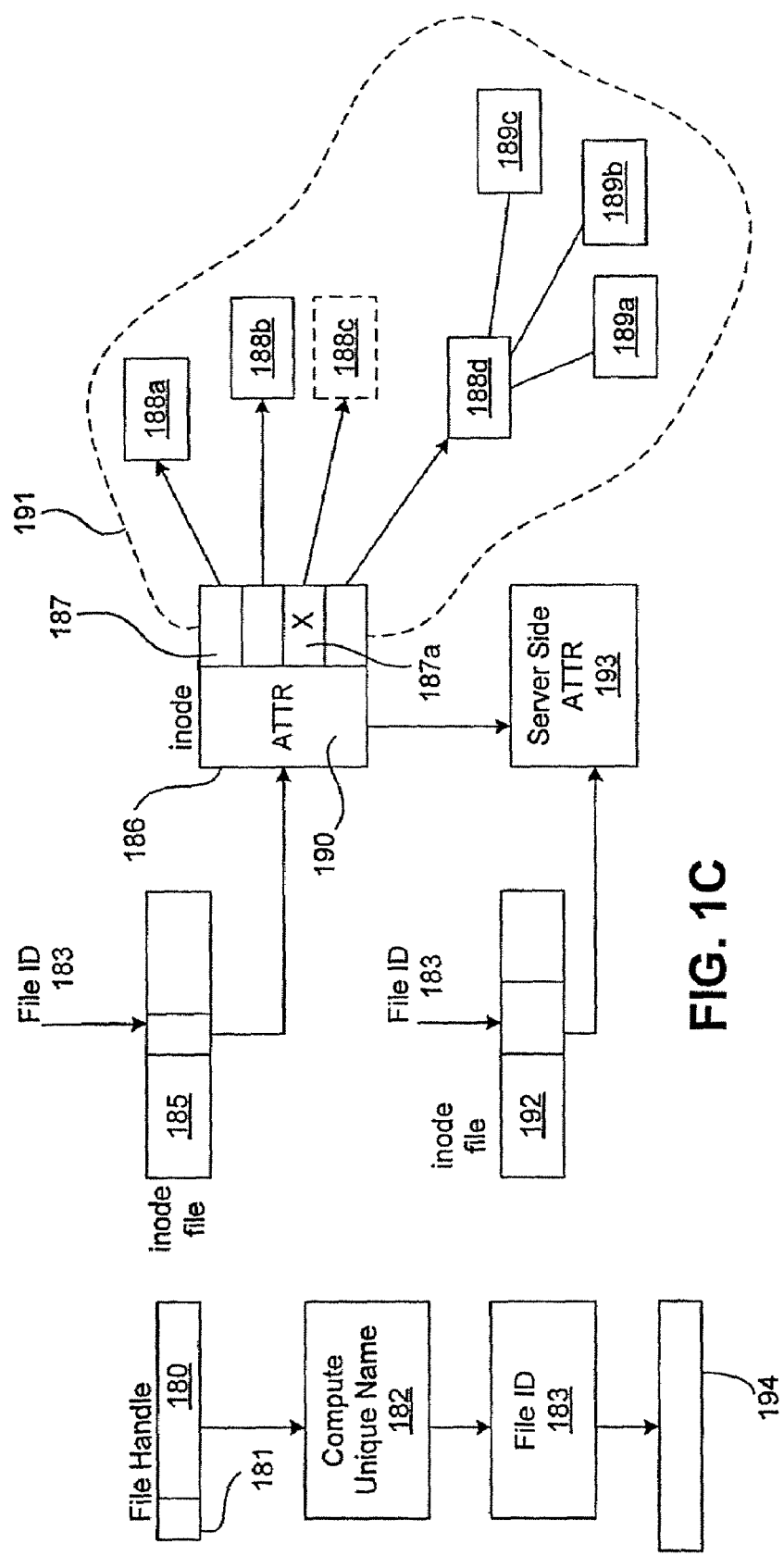
FIG. 1C is a block diagram illustrating a cache hit operation and a cache miss operation.

The functions for the other modules shown in FIG. 1B are described with references to FIG. 1C Cache Hit Reference is now made to the block diagrams in FIG. 1B and FIG. 1C to describe an operation of a proxy cache 115, in accordance with an embodiment of the invention. A file handle is used to name an object such as a file in a file system, and is described in additional detail below in with reference to FIG. 4.

Assume that a read request 172 is received by the proxy cache 115 (FIG. 1B) from a client 105, where the read request includes the file handle 180 having a value of, for example, FH="FILE1 ON CACHE". The network interface 161 will forward the read request to the naming virtualization layer 162, and the virtualization layer will map "FILE1" to a server file handle FH="FILE1 ON SERVER1" on a server 110 with an IP (Internet Protocol) address, 10.56.20.34, for example. Based on the file server identification (FSid) value 181 and the server IP address 10.56.20.34, the local access layer 165 will compute a unique name 182. In one embodiment, the algorithm for computing the unique name is the MD5 hash algorithm, which takes a message and converts it into a fixed string of digits, also called a message digest. It is also noted that the NFS service layer 163 or the CIFS service layer 164 serves the function of parsing the request 172, depending on whether the request is an NFS request or CIFS request.

Based on the unique name 182, the file system layer 169 will perform a lookup function in order to obtain a local cache file ID 183. In an embodiment, a module 184 in the file system 169 can perform this lookup function. If there is no matching local cache file ID, then a cache miss occurs, which is described further below.

The local cache file ID 183 is an index into an inode file 185 that points to an appropriate inode record 186. The inode record for an inode file 105 contains information describing the inode file associated with a given file system. Generally, an inode record is a data structure used to store information, such as metadata (attributes), about a file, whereas the file data blocks are structures used to store the actual data for the file. The information contained in an inode record may include, e.g., ownership of the file, access permission for the file, size of the file, file type and references to locations on disk of the data blocks for the file. The inode record 186 for the inode file 185 contains a pointer to a file system data block (e.g., WAFL data block), generally referenced as 188. A file data block is defined as a minimum addressable amount of data handled by the file system. A file data block is capable of storing, for example, 4 kilobytes (KB) of data. The inode record 186 can also point to indirect blocks which in turn can point to other file data blocks or other indirect blocks. For example, the indirect block 188*d* points to blocks 189*a*, 189*b*, and 189*c*, each of which may be file data blocks or indirect blocks.

In particular, the inode numbers 187 in an inode record 186 points to the file data blocks or indirect blocks. It is also noted that an inode record 186 also includes attributes 190 of a file stored locally in the proxy cache 115. It is further noted that in one embodiment, the local cache file ID 183 is also an index into a second inode file 192 that points to an appropriate inode record 193 that contains server-side attributes for a file. Server-side attributes can include, for example, file system ID, file ID, block size, number of hard links, and space available on the file system. Of course, the second inode file 192 can be combined with the inode file 185. By creating the second inode file 192, the first inode file 185 will advantageously not require modification to perform some of the functions described with reference to FIG. 1C.

It is also noted that an inode record includes a file buffer tree which is a data structure used to represent a file on a disk in a file system. In FIG. 1C, the file buffer tree 191 is formed by the block numbers 187 and the blocks 188 and 189.

An iovector 194 is then formed, where the iovector is a list of block numbers 187 in the file buffer tree 191. A block number 187 will indicate if a file data block is present or absent for a particular file. In an embodiment, a module 195 can form the iovector 194 and determine the presence or absence of a file data block. In an embodiment, a block number 187 will have a special value X (where X can be, e.g., −1 or −3) as shown by block number 187*a*, where the special value X indicates that the local cache file stored in the proxy cache 115 does not have a requested data block.

In a cache hit condition, a block number will not have the special value X, and the iovector is sent to the storage device manager 170 (e.g., a RAID layer). The storage device manager 170 will provide a pointer to the appropriate storage device(s) 171 and send the requested data block to the file system and to the NFS service (in the case of an NFS request) which creates an NFS response 173 to the requesting client 105. The requesting client 105 can, therefore, receive the requested file. The method described above can also be used to process requests for directories.

The special value X in the list of block numbers permits the tracking of buffers (in the storage devices) in the proxy cache with missing data blocks for a requested file and thus permits the tracking of sparse data. The level of indirection (by calculation of the unique name 182) permits a file handle to point to a different slot in the inode file, depending on the particular time, since a data block or cache file may be flushed from the proxy cache 115.

Cache Miss

When the iovector 194 is constructed, and if a block number 187 in the file buffer tree 191 contains the special value X indicating that the requested file data block is absent from a buffer (in the storage devices 171), then a cache miss condition is triggered. Alternatively, a cache miss condition is triggered if a matching file ID 183 is not found by the file system 169 when performing the table lookup function after computing the unique name 182.

The NFS fill engine 166 for an NFS request 196 (or CIFS fill engine for a CIFS request) will request the absent file data block from the server 110 with the data block. In the example of FIG. 1C, the absent file data block is shown as dashed box 188c. The request is sent by use of the server file handle, "FILE1 ON SERVER1", in the example above.

When the file data block is fetched (197) by the NFS fill engine 166 from the server 110, the data block is filled into the storage disk 171 by the remote fills layer 168, file system 169, and storage device manager 170. The block numbers in the buffer tree 191 is then updated and a file data block is allocated. The file data blocks are then sent to the requesting client 105 so that the requested file is provided to the client. The method described above can also be used to process requests for directories.

It is further noted that the embodiment shown in FIG. 1C permits sparse caching of file data blocks in a buffer tree within one file. This method advantageously permits partial file operations to be performed such as truncating operations or write operations in the middle of the file.

Typically, when a client 105 sends a request in the NFS protocol, a separate request is made for each data block. It is also noted that a separate request in the CIFS protocol is made for each data block. As an example, assume that a first client 105 (e.g., client 105(1) in FIG. 1) sends a request for data in data blocks 188a and 188b, which are both cached in the proxy cache 115 in the example of FIG. 1C. It is noted that the number of request for data from a client may vary. Since the data blocks 188a and 188b are cached in the proxy cache 115 when the client requests were received by the proxy cache 115, as a result, a cache hit condition is triggered, and the requested data blocks 188a and 188b are transmitted to the requesting client 105(1) by the proxy cache 115.

As an example of a cache miss condition, assume that a second client 105 (e.g., client 105(2) in FIG. 1) sends a request for data in data blocks 188a, 188b, and 188c. As noted in the example of FIG. 1C, the data blocks 188a and 188b are cached in the proxy cache 115 when the client requests were received by the proxy cache 115, while the data block 188c is absent from the proxy cache 115. In response to the cache miss condition, the proxy cache 115 will fetch the data block 188c from a server 110, as similarly described above. The fetched data block 188c is allocated in the proxy cache 115 and then transmitted to the requesting client 105(2) by the proxy cache 115.

Assume as a further example that another client 105 (e.g., client 105(n) in FIG. 1) sends a request for data in data blocks 188b and 188c. Since data block 188c was previously fetched by the proxy cache 115 from a server 110 and allocated in proxy cache 115, the data blocks 188b and 188c are present in the proxy cache 115 when the client requests were received by the proxy cache 115. As a result, a cache hit condition is triggered, and the requested data blocks 188b and 188c are transmitted to the requesting client 105(1) by the proxy cache 115. If a client 105 requests for a data block 188 that is absent from the proxy cache 115, then the proxy cache 115 can fetch the absent data block 188 from a server 110 and cache the fetched data block 188 before sending the fetched data block 188 to the requesting client 105.

Thus, replication of a partial object occurs in the proxy cache 115 in response to a client request, where a partial object is defined as one or more blocks of data of a file. In the example above, the data block 188c was replicated in the proxy cache 115 in response to a client request and is subsequently available to other requesting clients 105. As discussed below, suitable data replacement policies may be used to flush (from the proxy cache 115) a data block 188 or a file defined by multiple data blocks 188. In contrast, currently known replication techniques replicate entire files (e.g., entire volumes or entire sets of files are replicated in various mirroring techniques).

Replacement Policies

Figure 2:
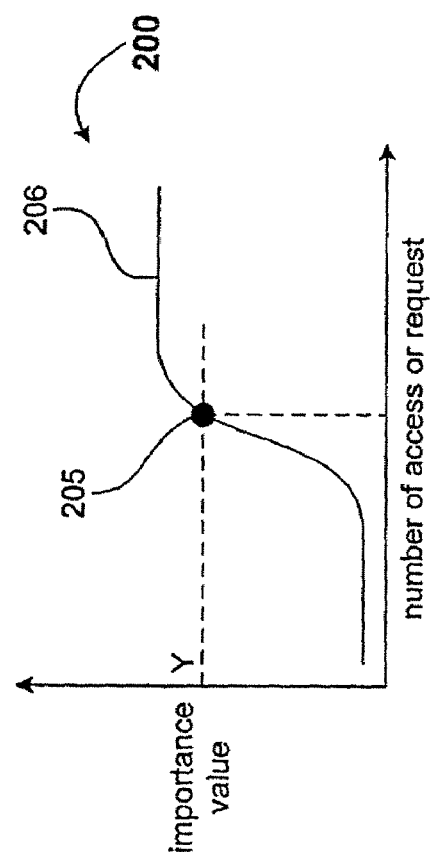
FIG. 2 is a block diagram illustrating a method of managing the active data set by use of an aging scheme or importance scheme, in accordance with an embodiment of the invention.

Various methods may be used as a replacement policy to refresh, retain, or flush data files in the active data set 140 from the proxy cache 114. FIG. 2 is a graph 200 which illustrates a method of increasing the importance of cached data in the active data set 140 based upon the number of access or request for the cached data from a client(s) 105. Thus, the proxy cache 115 can be configured to dynamically assign and adjust an "importance" value to a cached data in the active data set 140 based upon the number of access or request for the cached data from a client 105. As the number of access or request to the cached data increases, the proxy cache 115 will increase the importance value of the cached data. A cached data in the active data set may be prevented from being flushed from the storage unit of the proxy cache 115 if, for example, the cached data attains an importance value Y (as graphically shown by point 205 in the graph of FIG. 2). It is noted that the function 206 in FIG. 2 may have other graphical shapes such as a linear graph.

Figure 3:
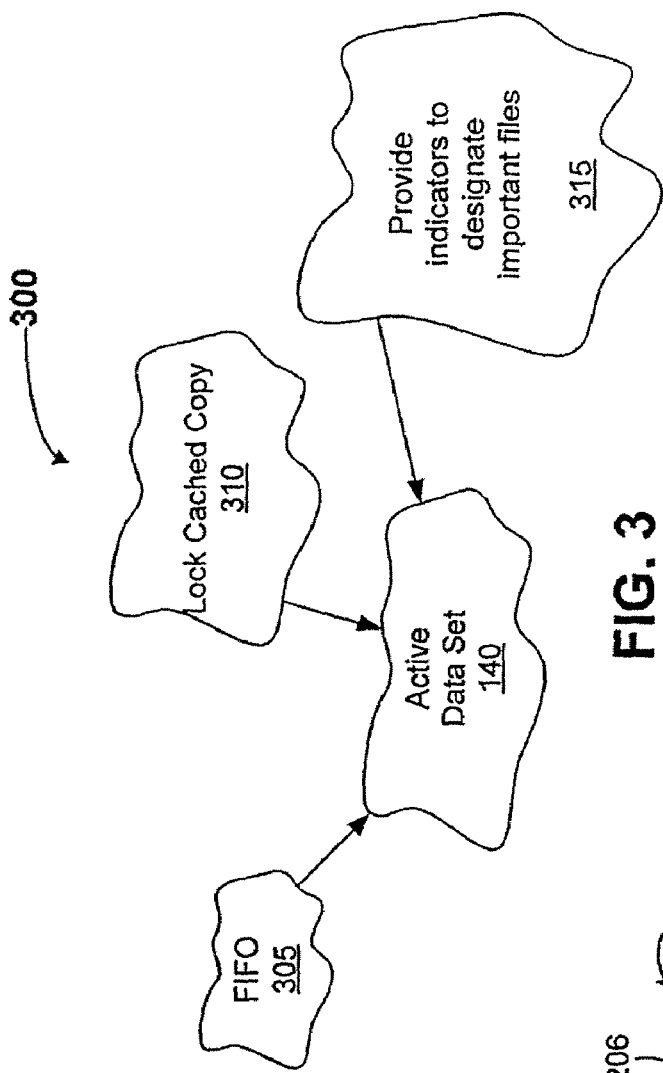
FIG. 3 is a block diagram illustrating other methods for managing the active data set, in accordance with embodiments of the invention.

FIG. 3 is a block diagram illustrating other methods 300 for managing the active data set 140, in accordance with embodiments of the invention. As mentioned above, an active data set 140 may be replaced or flushed from the proxy cache 115 by a suitable method such as first-in-first-out (FIFO) method 305. In the FIFO method 305, the active data set 140 is rotated for flushing from the storage units in the proxy cache 115. Other suitable replacement policies may be used such as the Least Recently Used (LRU) method. LRU refers to a replacement method, typically used in database management systems, where the block that has not been used for the longest time is the first to be replaced.

Alternatively or additionally, a file in the active data set 150 may be locked (310) by a user by sending a lock command to the proxy cache 115 from a client 105, so that the lock command prevents the file from being deleted in the proxy cache. The user may send a lock command if, for example, the user is concerned that the link connection to a server 110 may be broken or that the server 110 may fail. Alternatively, an attribute (metadata) of an object (e.g., file or data block of a file) may indicate how long an object is to remain cached in the proxy cache.

Alternatively or additionally, the user may provide (315) hints or indicators to the proxy cache 115 to designate particular cached files as important. As a result, the indicators will prevent the designated important files from being flushed from the storage unit(s) of the proxy cache 115.

By use of the proxy cache 115, data can be distributed and replicated at various remote locations and advantageously avoid the use of conventional mirroring techniques to replicate data. The use of conventional mirroring techniques requires that entire data sets are mirrored at a pre-determined time or interval (e.g., on a nightly basis) and requires disk spaces for the entire data sets. In contrast, the proxy cache caches 115 replicates data in the active data set 140 on-demand, and the active data set 140 advantageously eliminates the large disk requirements of previous methods for data replication. Additionally, the active data set 140 is automatically updated or flushed in response to a cache miss, and thus eliminates the special software requirements of previous methods for data replication.

Method of Consolidating the Mount Points and Re-Writing/Mutation of File Handles)

In order to perform operations via the NFS network file system protocol, a client sends NFS requests to the NFS server with: (1) an NFS file handle that specifies the target of the operation, (2) the operation (lookup, read, write, change permissions), and (3) the user on whose behalf the request is sent. When an NFS client wants to access a remote file system for the first time, the client first needs to obtain a root file handle, which is the file handle for an entry point into a volume (as noted above, the term "volume" is synonymous with the term "file system"). To this end, the client host sends a mount request to the server's mount daemon, where the mount request is part of the protocol for accessing a root file handle and a daemon is a program that runs continuously and exists for the purpose of handling periodic service requests that a computer system expects to receive. The daemon program forwards the requests to other programs (or processes) as appropriate. The server's mount daemon verifies that the client has permission to access the requested file system. When the mount daemon grants access, it sends a (directory) file handle back to the NFS client. Typically, the file handles are each, for example, 32 bytes of opaque identifier data. If a file name is changed, the file handle remains the same for that renamed file. Thus, the mounting process described above is a protocol to access a root file handle.

NFS file handles are not globally/universally unique, since two different servers could use the same file handles. Traditionally, this condition is not a problem, as clients keep track of which file handles are associated with each particular server. When a proxy cache 115 is used to consolidate mount points, it may export volumes from many different servers. Since these file handles are not unique, the proxy cache 115 may be unable to determine which file handle corresponds to which origin server, and this condition may result in a collision problem, since a first file in a first specific server and a second file in a second specific server may have identical file handles. The problem is exacerbated since the file handle is defined to be opaque, which means that typically the content of a file handle can not be determined and only the name of the file handle can be obtained.

In an embodiment of the invention, by mutating file handles before sending the file handles to the client 105, the proxy cache 115 is able to interpret file handles and determine the destination server 105 of any file handle. As a result, clients 105 can access data through a proxy cache 115 without an explicit knowledge of the particular server at which the data originates.

As shown in FIG. 4, a file handle 400 includes various fields such as an $FS_{id}$ (file system identifier) field 405, a file identification (ID) field 410, a generation number field 415, and a field 420 for other data. Typically, the $FS_{id}$ field 405 is about 4 to 8 bytes.

An embodiment of the invention allows for the virtualization of server-side file handles. By introducing a proxy cache 115 between clients 105 and servers 110, file handles can be mutated (translated) to allow for the construction of a uniform global name-space. File handles returned to clients can be changed to indicate that they map to different origin servers, different sets of export options, or that they cross mount points. By adding a layer of indirection between the file handle sent to a client and the file handle used to access the object on the origin server, changes to origin servers 110 can made without ever impacting the clients 105.

Figure 6:
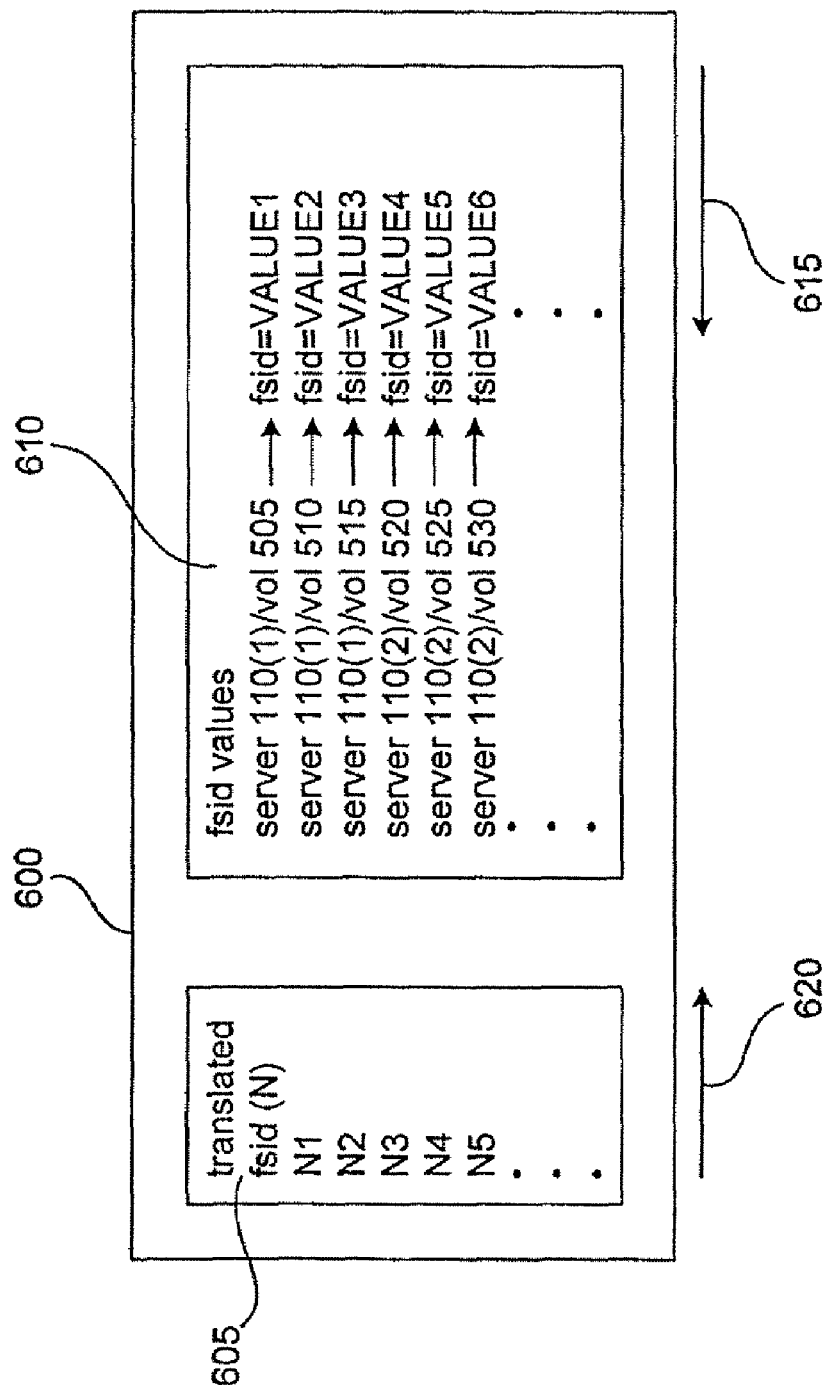
FIG. 6 is a block diagram illustrating a mapping of $FS_{id}$ values for each volume in a particular server, in accordance with an embodiment of the invention.

FIGS. 5 and 6 are diagrams that illustrate a method of consolidating the mount points and method of re-writing or mutation of file handles, in accordance with an embodiment of the invention. As shown in FIG. 5, each server 110 typically includes volumes (e.g., Vol/Vol1, Vol/Vol2, Vol/Vol3), where each volume represents a file system. Thus, the server 110(1) may include volumes 505 to 515, while the server 110(2) may include volume 520 to 530.

As shown in FIG. 6, a mapping 600 of $FS_{id}$ values can be made for each volume in a particular server 110 and the mapping 600 may be stored in the proxy cache 115, in accordance with an embodiment of the invention. The translation of every $FS_{id}$ value beneficially permits a determination of which server stores a particular file in response to a cache miss.

A translation table 605 contains hash values N (e.g., N1, N2, N3, . . . ), while an $FS_{id}$ table 610 contains $FS_{id}$ values for each volumes in the servers 110. When traffic 615 is received from a server 110 with a particular $FS_{id}$ value in the file handle (e.g., volume 505 in server 110(1) with $FS_{id}$=VALUE1 in the example of FIG. 6), then the $FS_{id}$ value=VALUE1 is translated into a translated $FS_{id}$ value N1 in table 605 in the proxy cache 115. Other $FS_{id}$ values from other received file handles from the servers 110 are stored in the table 610 and translated or mutated into different values N in table 605. Thus, when a file handle 620 is received from a client 105 (in the event of a client data request) and a cache miss occurs, then the proxy cache 115 uses the mapping 600 with the N values and the $FS_{id}$ values in table 610 to determine the particular server 110 and file/volume to direct the file handle 620. The translated $FS_{id}$ value N of the file handle 620 is converted by the proxy cache 115 into the appropriate $FS_{id}$ value from table 610 before sending the file handle 620 to the destination server 110.

A value N in table 600 is computed based on some hash that is based on the address of the server 110 with the volume and/or other identifiers. The hash for each N value is unique and thus avoids the name collision problem that was mentioned above. Typically, a value N may be an 8 byte number and may have a value set based on the server name, volume name and file name (e.g., filer1/Vol0/file0).

Alternatively, a value N may be calculated based on the server Internet Protocol (IP) address and the server file handle value by use of the MD5 algorithm as previously described above. Since the file handle value may not be unique across different servers, the server IP address can make each value of N distinct for files across different servers.

Figure 7:
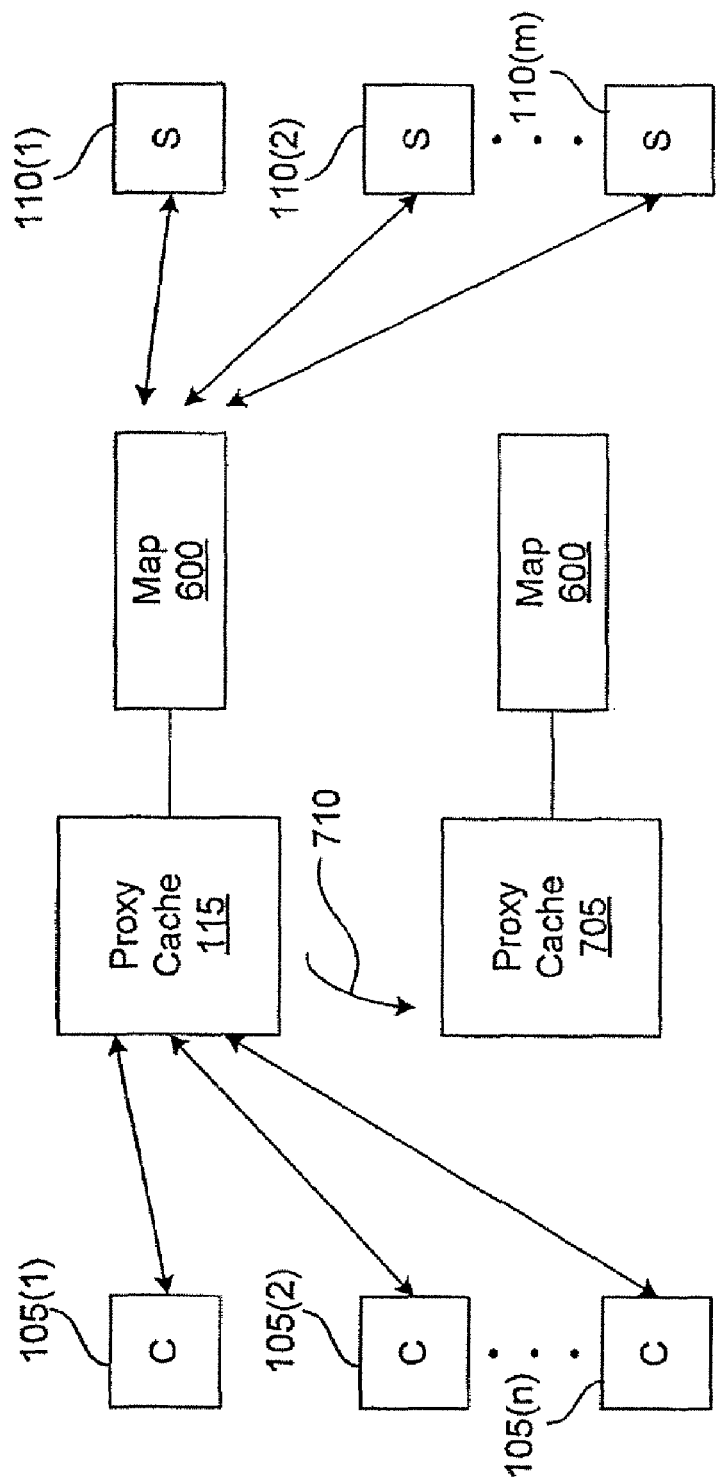
FIG. 7 is a block diagram of a network system including multiple proxy caches with identical mapped file handles, in accordance with an embodiment of the invention.

As shown in FIG. 7, the mapping 600 can be duplicated in various proxy caches (e.g., proxy caches 115 and 705). As a result, the mapping 600 will be available from other proxy caches if a particular proxy caches fails. For example, if clients 105 are no longer able to access the proxy cache 115 due to device failure, then a fail-over 710 can be performed to the proxy cache 705 so that the clients 105 can access the proxy cache 705 with the mapping 600 for re-writing of the file handles 400

Additionally or alternatively, since the mapping 600 can be duplicated into multiple proxy caches, a proxy cache (e.g., proxy cache 115) can be swapped with a new or another proxy cache (e.g., proxy cache 705) without requiring clients 105 to un-mount and re-mount their volumes and without requiring other changes in the clients 105.

Method of Creating and Using a Virtual Global Name Space

In addition to allowing for the consolidation of mount points as described above, an embodiment of the invention also provides for the creation of a uniform global name-space. Traditionally, NFS mount points can not be nested (i.e., if a client mounts an NFS volume, then that volume can not contain other mount points). This limitation makes the creation of a uniform view of a network very difficult.

Using virtualization of file handles in accordance with an embodiment of the invention, administrators can configure arbitrary directories in NFS exported volumes as mount points (access points to a file system). This means that clients 105 only need to mount one volume, but when they access this volume, the proxy cache will properly redirect the client requests to the particular appropriate volume. Thus, a proxy cache 115 can inform every client 105 about each server 110 (or new added server) by use of a single mount point. By renaming objects, a virtual global view of the files (i.e., virtual global name space) is created, and as a result, each client 105 has information about each server 110 and about each file in each server 110 by use of the virtual global view of the files. The virtual global name space leads to ease in administration of the clients 105.

Figure 8:
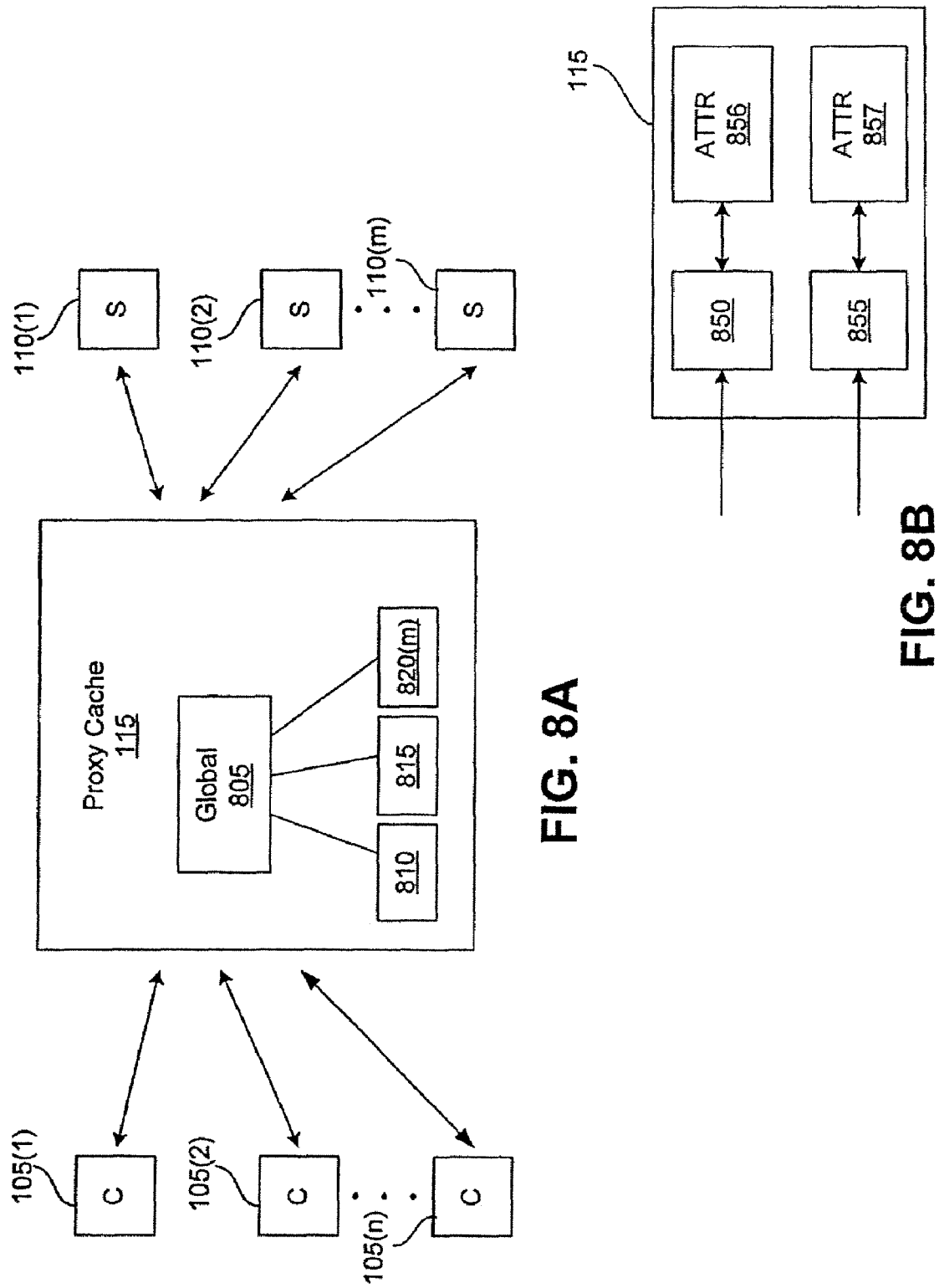
FIG. 8A is a block diagram illustrating a local directory for permitting a virtual name space, in accordance with an embodiment of the invention.
FIG. 8B is a block diagram illustrating a method of creating multiple mount points where a set of attributes are associated with a mount point.

As shown in FIG. 8A, multiple clients 105 can access a volume name 805 (in the proxy cache). An example volume name can be, "/global". The volume name 805 permits a virtual name space in accordance with an embodiment of the invention. A client 105 can mount the volume name 805 and view folders 810, 815, 820*m* associated with the servers 110(1), 110(2), and 110(*m*), respectively. Each folder 810, 815, and 820*m* will contain volume names assigned to particular servers. Thus, the volume name 805 points to server 110(1)/vol505, server110(1)/vol510, server110(1)/vol515, server110(2)/vol520, server110(2)/vol525, server110(2)/vol530, and to other known volumes in the servers 110. Therefore, the folders 805-820*m* are virtually mapped to the mount point via volume name 805. The clients need only know about a single mount point (e.g., /global) to access the appropriate servers 110. The mapping 600 (see FIG. 6) is used to permit the file handles 400 to be virtual access points into volumes of servers 100, along with the re-writing of file handles in the NFS protocol. As mentioned above, the mount process involves communicating with the server to get the root file handle for the file system, which can later be passed to the lookup Remote Procedure Call (RPC) to locate other file handles in the remote file system directory hierarchy.

An advantage permitted by the single mount point is that the clients 105 need not be aware of every single mount points. In previous approaches, each client typically has an FStab file (file system table file), which lists all known remote file systems in folders (i.e., FStab is a list of local directories or folders in a client where the client can access a driver and server name and volume name). If a change occurs in a server 110, where the change affects the name space, then each client 105 will be required to be reconfigured so that the clients are able to access the servers, resulting in the complicated and time consuming mount point management tasks of the previous approaches.

In an embodiment of the invention, each client will only need to mount the directory 805 and this single consolidated mount point leads to simplified mount point management. In particular, the mount point is un-mounted and mounted on the proxy cache 115, and as a result, the volume name 805 will not require un-mounting and re-mounting on the clients 105. Thus, the directory 805 provides the function of a file system table file where clients can access drivers and servers. The directory 805 provides a list of access points to remote file systems and associated attributes as stored in a remote server(s) 110.

Method of Creating Multiple Mount Points where a Set of Attributes are Associated with a Mount Point.

A file handle can be re-written in different ways for the same object. In an embodiment, a file handle can be re-written in different ways based upon attributes of the associated local mount point on the proxy cache.

Reference is now made to FIG. 8B. A mount point is defined as a local volume name. As an example, the local volume name, user/read-only/employee1 (see block 850) and local volume name, user/employee1 (see block 855) will each yield two different file handles because the mount point for each local volume name differs. In particular, the mount point of user/read-only/employee1 850 is "user/read-only", while the mount point of user/employee1 855 is "user".

A local volume name can have associated attributes or meta-data such as access restrictions, eligibility for storage or cachebility, security attributes, authentication, and authorization levels for proxy cache devices, as well as read-only or write-only attributes for servers. The attribute associated with the same data can be changed by accessing a mount point associated with another volume that shares the same data. Thus, particular attributes can be associated with a particular mount point or access point, which can be hashed to form a unique identifier. In an embodiment of the invention, the unique identifier is a hashing of a local volume name, file system ID, and server IP address by use of a suitable hashing algorithm such as MD5. In the example of FIG. 8B, the attribute(s) 856 is associated with the mount point 850, while the attribute(s) 857 is associated with the mount point 855.

It is further noted that the same physical object on disk in the proxy cache 115 can be accessed from the different mount points.

Figure 9:
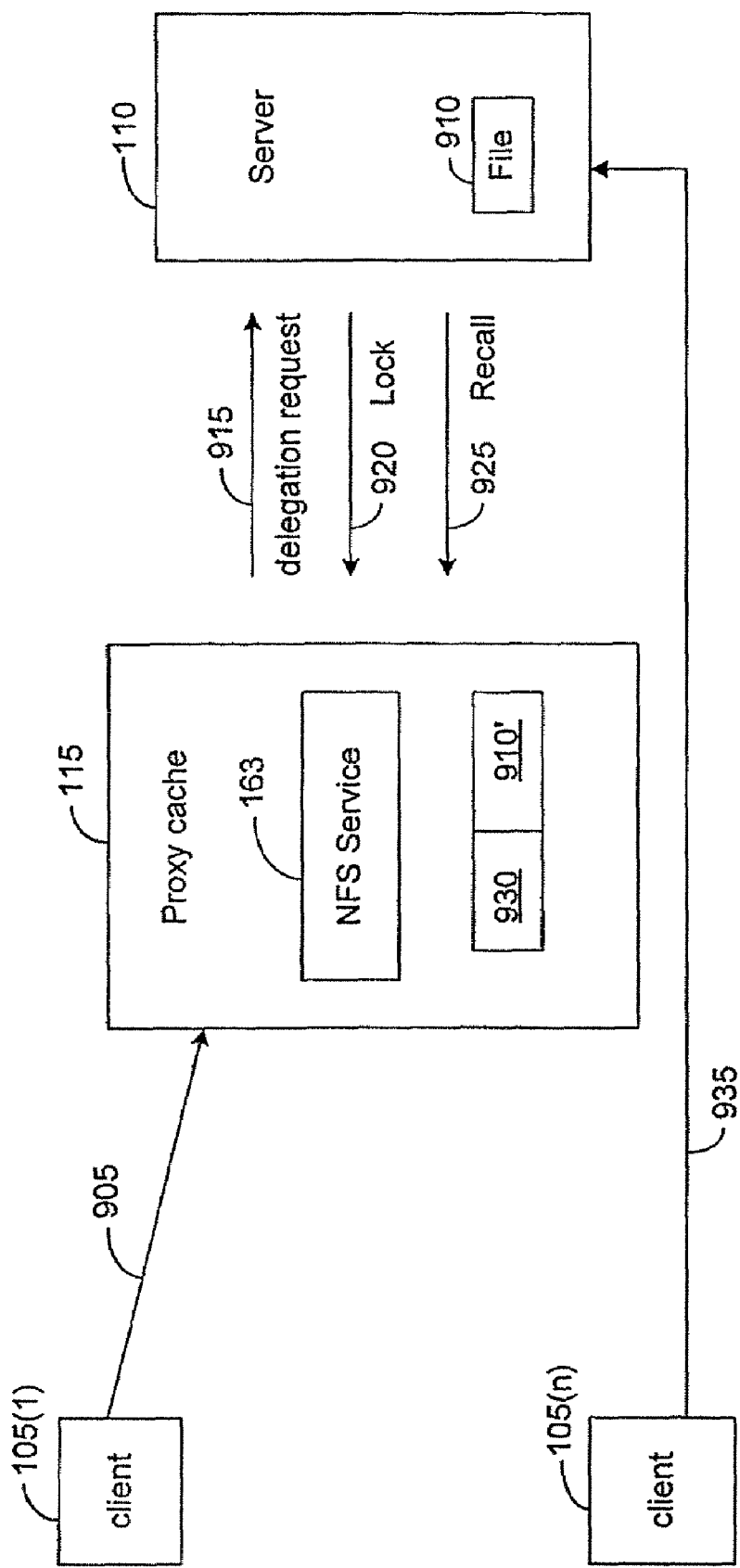
FIG. 9 is a block diagram illustrating a network in accordance with an embodiment of the invention for purposes of describing a method of delegation, where the proxy cache provides an involuntary lock giveback to the server.

FIG. 9 is a block diagram illustrating a network 900 in accordance with an embodiment of the invention for purposes of describing a method of delegation, where the proxy cache 115 provides an involuntary lock giveback to the server 110. In response to a write request 905 from a client 105(1) to a particular file 910 (in this example), the NFS service 163 of the proxy cache 115 can send a delegation request 915 to the server 110 for a lock (or delegation) for the particular file 910 so that no other device can perform a write access to the particular file 910. The server 110 grants a lock (delegation) 920 to the proxy cache 115, where the lock 920 is associated with the particular file 910 in this example. As a result, the particular file 910 becomes a delegated file after the lock 920 is granted to the proxy cache 115. The server 110 will prevent immediate write operations to the delegated file 910 by use of file locks or other known techniques, until the server 110 sends a callback RPC to the proxy cache 115 to recall the lock (delegation) and the proxy cache 115 gives back the lock 920 to the server 110 as discussed below.

The lock 920 for the particular file 910 is typically granted by the server 110 if the particular file 910 is not being accessed on the server 110 by another proxy cache or another client, or if no other conflicting access is occurring for the file 910. The lock 920 will typically specify the object of the delegation. In the example of FIG. 9, the object of the delegation is the particular file 910, although other objects may be delegated. Typically, a lock 920 for a particular file 910 can be granted if the NFS version 4 distributed process protocol is used by the server 110 and proxy cache 115 for communications with each other. Additional background discussion on delegation is provided in the NFS Version 4 Protocol <http://www.nfsv4.org/>.

After the lock 920 for the particular file 910 is granted, the write request 905 from the client 105(1) to the particular (delegated) file 910 will result in modification of the cached copy 910' of the delegated file 910 that is cached in the proxy cache 115. The modification of the cached copy 910' is shown by modified data 930. The processing of write requests and read requests for a file that is cached in the proxy cache 115 has been previously discussed above with reference to FIGS. 1B and 1C. The proxy cache 115 includes a processor to execute the operating system that is shown in FIG. 1B.

An involuntary giveback of the lock 920 from the proxy cache 115 to the server 110 for the delegated file 910 will occur if another client (client 105(n) in this example) sends a write request or read request (request 935 in this example) to the server 110 to access the delegated file 910 that is stored in the server 110. An access request from another proxy cache for the delegated file 910 may also results the involuntary giveback of the lock 920 from the proxy cache 115 to the server 110. The server 110 will send a lock recall 925 to revoke the lock 920 held by the proxy cache 115 for the delegated file 910. In response to the lock recall 925, the proxy cache 115 will involuntarily give back the lock 920 to the server 110 for the delegated file 110. Additionally, in response to the lock recall 920, the proxy cache 115 will also send (to the server 110) the modified data 930 of the cached copy 910' of the delegated file 910 to the server, where the modified data 930 includes all changes that has been performed by the write request(s) 905 from the client 105(1) for the delegated file 910. The proxy cache processor and the cache operating system (FIG. 1B) can determine the modified data 930 in the cached copy 910' of the delegated file, by use of, for example, standard data management techniques. The NFS service layer 160 then sends the modified data 930 to the server 110.

After the server 110 receives the modified data 930, the server 110 can update the delegated file 910 based upon the previous write request(s) 905 that were received by the proxy cache 115 from the client 105(1). As a result, the server 110 has the latest (most fresh) version of the particular file 910 and can serve this latest version to the requesting client 105(n) and any proxy cache or client that subsequently request access to the file 910.

Figure 10:
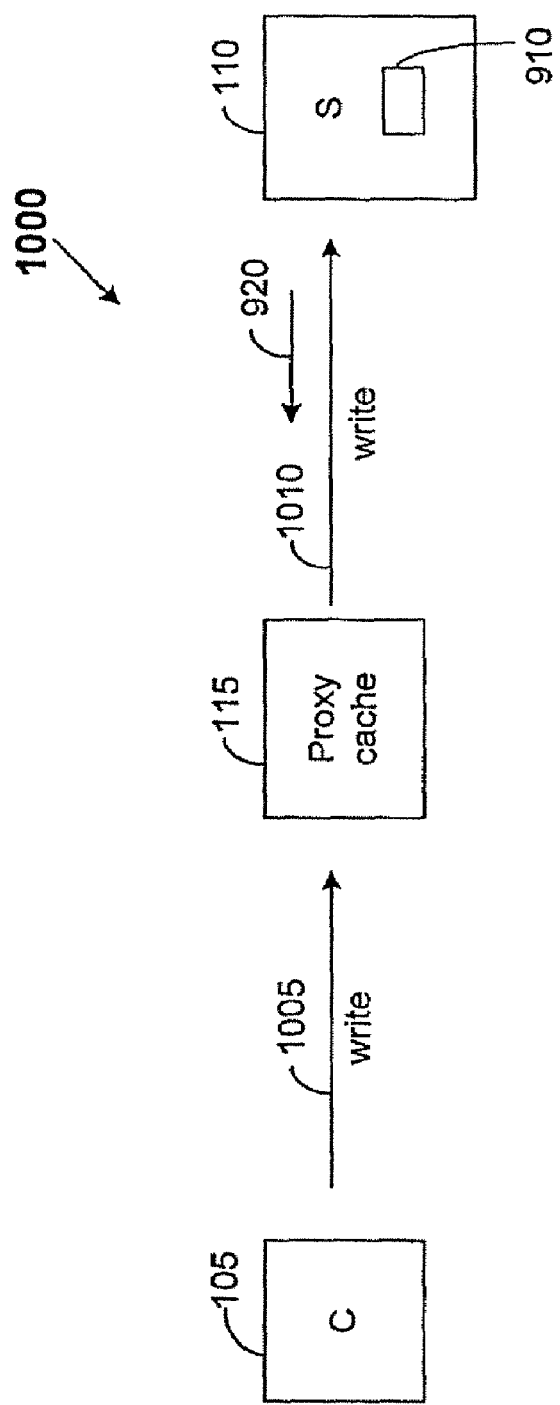
FIG. 10 is a block diagram illustrating a network in accordance with an embodiment of the invention for purposes of describing a method of delegation, where the proxy cache provides a voluntary lock giveback to the server.

FIG. 10 is a block diagram illustrating a network 1000 in accordance with an embodiment of the invention for purposes of describing a method of delegation, where the proxy cache 115 provides a voluntary lock giveback to the server 110. If the server 110 has granted a lock (or delegation) 920 to the proxy cache 115 in a manner as previously and similarly described above, where the lock 920 is associated with the particular file 910, then the proxy cache 115 can voluntarily give back the lock 920 to the server 110 for the delegated file 910. After voluntary give back of the lock 920 to the server 110, the proxy cache 115 will also send the modified data 930 of the cached copy 910' of the delegated file 910, where the modified data 930 includes all changes that has been performed by the write request(s) 1005 from the client 105 for the delegated file 910. As a result, the server 110 has the latest version of the particular file 910 and can server this latest version to any requesting proxy cache or client.

After the proxy cache 115 gives back the lock 920 to the server 110, the proxy cache 115 sends the modified data 930 by asynchronously writing the modified data 930 to the server 110. The proxy cache 110 can asynchronously write the modified data 930 to the server by a delayed write method and/or by a deferred write method.

In the delayed write method, the proxy cache 115 can write the modified data 930 to the server 115 as soon as the proxy cache is able to perform a write operation 1010 to the server 110. For example, the write operation 1010 can be performed during idle times in the network, and/or based upon bandwidth limitations (e.g., perform the write operation during a time when there is maximum network bandwidth available).

In the deferred write method, the proxy cache 115 can write the modified data 930 to the server 110 by performing the write operation 1010 by periodically performing the write operation or by performing the write operation according to a schedule.

The write operation 1010 can be performed as a background operation of the proxy cache 115 or can be performed at a later time.

The embodiment shown in FIG. 10 provides the following advantages. The proxy cache 115 can serve write requests 1005 from clients 105, including write requests from servers, when the proxy cache 115 is disconnected from the origin server or is otherwise non-operative. The proxy cache 115 can later write the data in the write requests 1005 to the server 110. Thus, the proxy cache 115 can send the write data to the server 110 at a subsequent time when the server 110 is again on-line. Thus, clients 105 that are served by use of the proxy cache 115 do not see any or only minimal disruption of their requests.

The write operation 1010 can be performed at a rate slower than the rate of write operation 1005. Additionally or alternatively, the write operation 1010 can be performed at a delayed time or at a time subsequent to the write operation 1005. Thus, if the WAN connecting the proxy cache 115 and server 110 fails or if a planned-disconnect occurs between the proxy cache 115 and server 110, or if the server 110 becomes non-operational, then the proxy cache 115 can perform the write operation 1010 to the server 110 at a later time when the WAN becomes operational. This delayed write feature insures that the write data is eventually stored in the server 110, without slowing down or affecting the operation of the client 105.

The write operation 1005 may be permitted to invalidate non-read-only data stored in the proxy cache 115. Additionally, write data (from write operation 1005) that is cached in the proxy cache 115 does not require a deletion action, since the write data will be subsequently flushed from the proxy cache 115 by use of, for example, a FIFO operation as described above.

Delta Writes

Figure 11:
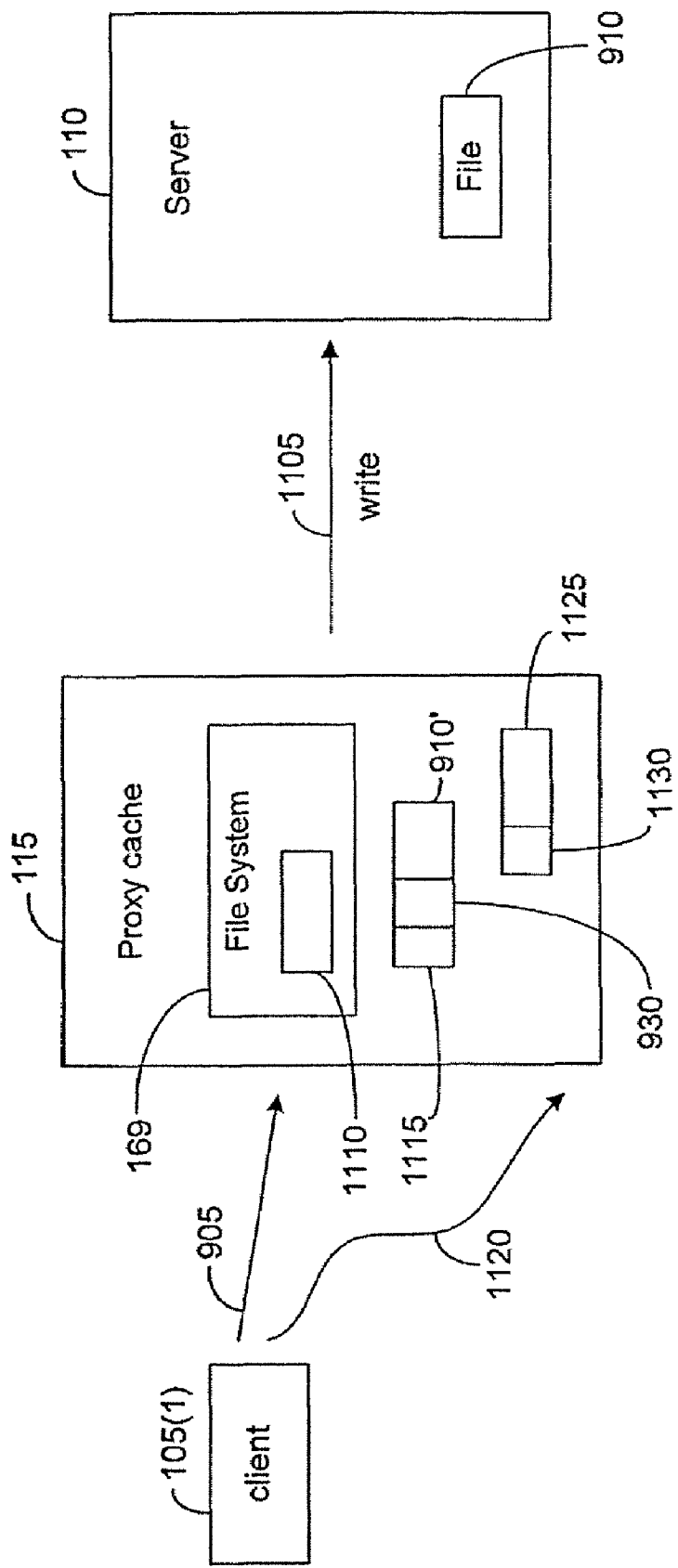
FIG. 11 is a block diagram illustrating a method to identify modified data that has been transmitted from the proxy cache to the server.

FIG. 11A is a block diagram illustrating a method to identify modified data 930 that has been transmitted from the proxy cache 115 to the server 110. As noted above, the proxy cache 115 receives a write request(s) 905 from a client 105(1) and modifies a cached copy 910' of a particular file 910 that is stored in the server 110. The write request(s) 905 modifies the cached copy 910' with the modification shown by modified data 930. After the proxy cache 115 sends a write operation 1105 to the server 110 to write the modified data 930 to the server 110 in order to update the file 910, a tag module 1110 (that is executed by the proxy cache processor and that communicates with the proxy cache operating system of FIG. 1B) will place a tag 1115 in a field in the cached modified data 930. For example, the field can be memory space associated with the cached modified data 930. The tag 1115 permits the proxy cache operating system to identify the modified data 930 as having been written to memory in the server 110 and to permit subsequent deletion or flushing the modified data 930 (and associated cached file 910') from memory in the proxy cache 115.

Assume that the client 105(1) (or another device) sends a write request 1120 to modify a cached file 1125 in the proxy cache 115, where the modification is shown as modified data 1130. If the proxy cache 115 has not yet performed a write operation 1105 to write the modified data 1130 to memory in server 110, then the tag module 1110 will not place a tag 1115. Since a tag 1115 is not yet placed on the modified data, the proxy cache operating system (FIG. 1B) will not yet flush the modified data 1130 from the proxy cache. After the modified data 1130 is written to the server 110 by a write operation 1105, then the tag module 1110 will place a tag 1114 to the modified data 1130. The tag 114 permits the modified data 1130 to be eligible for subsequent flushing from the proxy cache 115.

Data Consistency

Figure 12A:
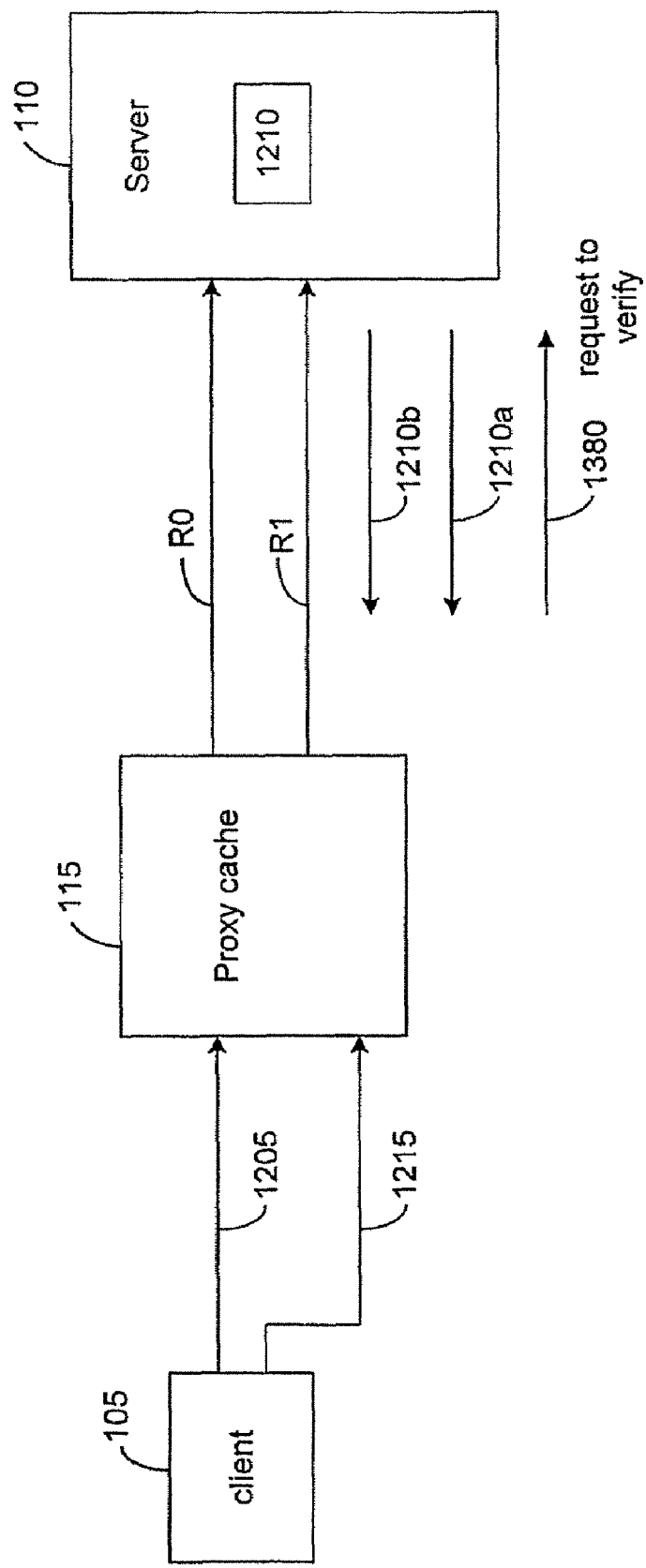
FIGS. 12A to 12D are block diagrams illustrating a method of data consistency in accordance with an embodiment of the invention.
Figure 12C:
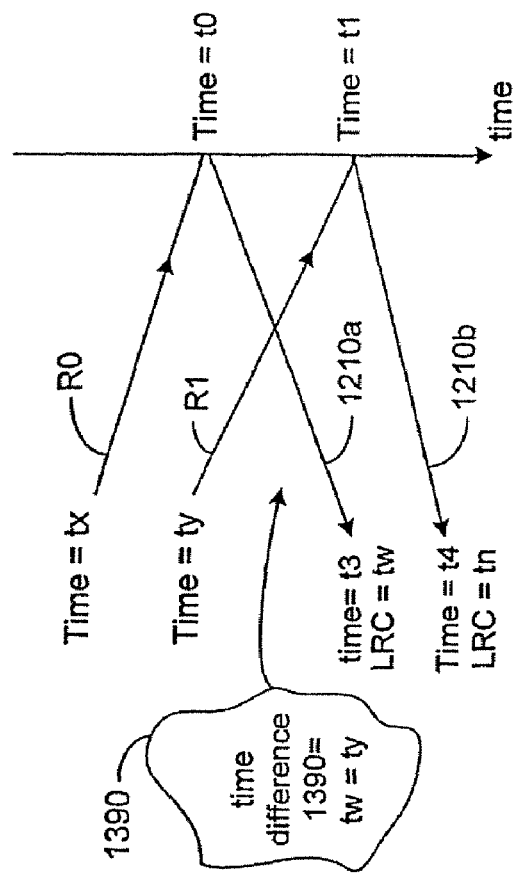
Figure 12B:
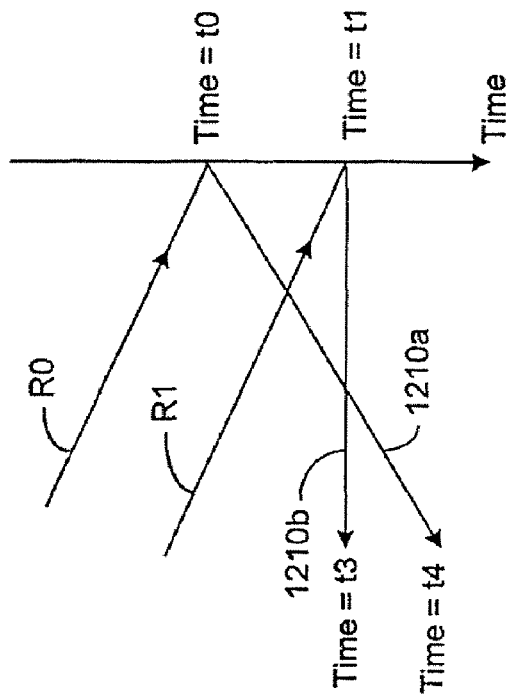

FIGS. 12A and 12B shows a diagram of a case when a client 105 sends a request 1205 to access an object 1210 (e.g., data block, file, or directory) in the server 110. Assuming that a cached copy of the object 1210 is not stored in the proxy cache 115, the proxy cache 115 will send an access request R0 to the server 110, and the request R0 is received by the server 110 at time t0. Assume that the client 105 sends a subsequent request 1215 to the proxy cache 115 to access the object 1210. It is noted that the subsequent request 1215 may originate from another device such as another client. A subsequent request R1 is then made by the proxy cache 115 to the server 110, and the request R1 is received by the server at time t1.

However, in the example of FIG. 12B, a first version 1210*a* of the object 1210 in response to the first request R0 is received by the proxy cache 115 at a time t4 which is subsequent to the time t3 when the proxy cache 115 receives the second version 1210*b* of the object 1210 in response to the second request R1. Thus, in the example of FIG. 12B, it may be possible that the subsequently received version 1210*a* is not the latest version of the object 1210. As discussed below, an embodiment of the invention permits the proxy cache 115 to verify if the latest received version of an object (received by the proxy cache 115 from the server 110) is the latest version of the object.

FIG. 12C shows a diagram of a case when a previous request R0 from the proxy cache 115 is made to a server 110, and the first version 1210*a* of the object 1210 in response to the first request R0 is received by the proxy cache 115 at a time t3 which is prior to the time t4 when the proxy cache 115 receives the second version 1210*b* of the object 1210 in response to the second request R1.

Figure 12D:
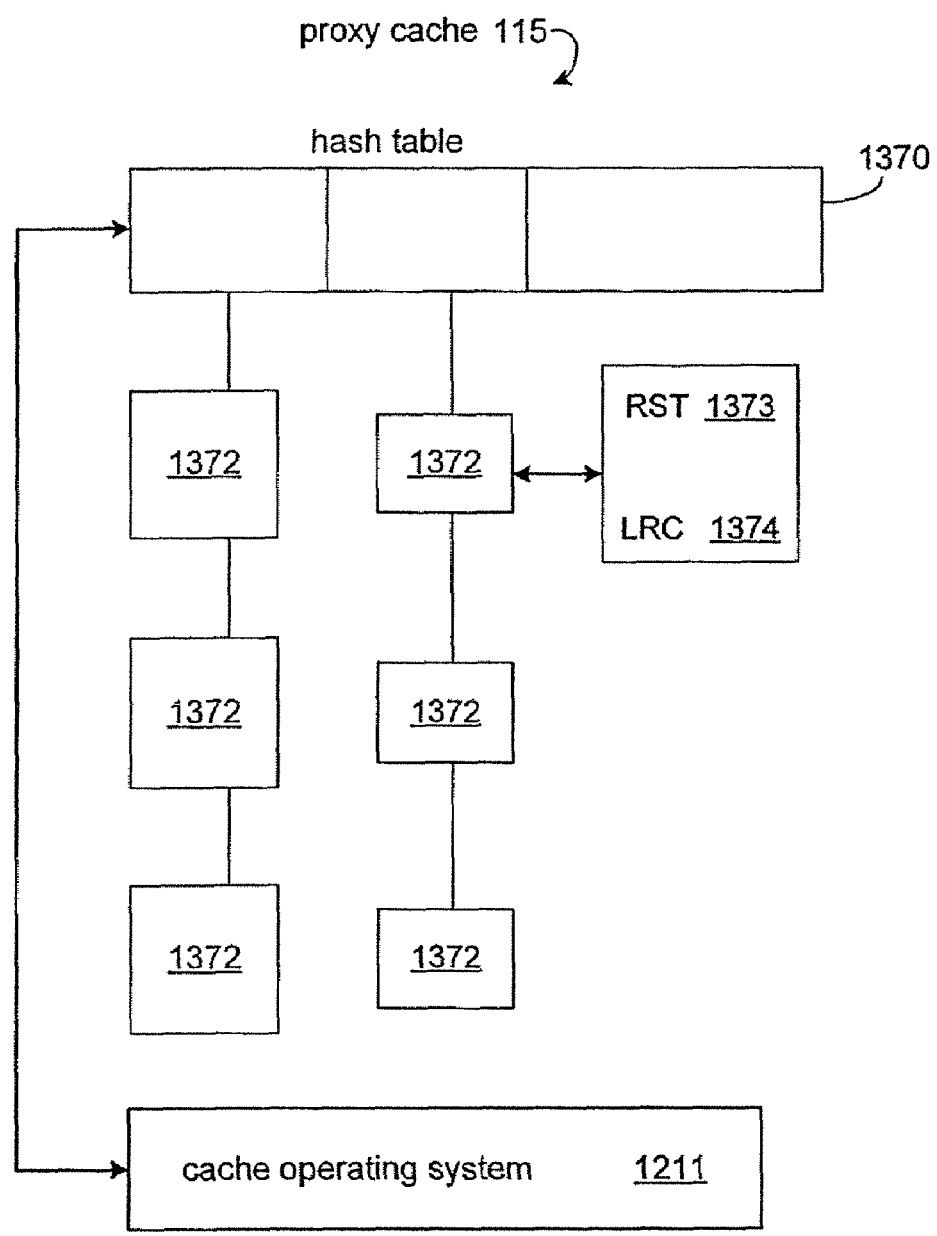

As shown in FIG. 12D, in an embodiment of the invention, the proxy cache 115 stores a hash table 1370. The hash table 1370 will contain entries 1372. The cache operating system (FIG. 1B) is configured to enter and read the values in the hash table 1370. Each entry 1372 is associated with an object in the server 110 (such as object 1210). Each entry 1372 will contain an RST value 1373 and a last recorded change (LRC) value 1374. Therefore, each object 1210 will have an associated RST value 1373 (an attribute) and an associated LRC (last recorded change) value 1374 (an attribute). An RST value 1373 will indicate a time value when a request from the proxy cache 115 to the server 110 was made. For example, with reference to FIG. 12C, the RST value for R0 is time=tx, and the RST value for R1 is subsequent time=ty. The LRC value 1374 will indicate a time value when an object was last change. For example, with reference to FIG. 12C, the LRC value for 1210*a* is time=tw, and the LRC value for 1210*b* is time=tn. Therefore, in the proxy cache 115, the proxy cache operating system can track, store, and determine the RST value 1373 and LRC value 1374 for each object that is cached in the proxy cache 115. It is noted that a request (e.g., request R0) from the proxy cache 115 will ideally occur immediately after the occurrence of the request a request (e.g., request 1205) from the client 105. Therefore, it is within the scope of embodiments of the invention to substitute the R0 time value with the time value of request 1205 as an RST value and to substitute the R1 time value with the time value of request 1215 as an RST value. For purposes of focusing on the functionalities of embodiments of the invention, the time value of R0 and R1 will be used only as examples in this discussion.

In an embodiment of the invention, the proxy cache 115 (by use of cache operating system 1211) can read the RST value 1373 and LRC value 1374 in the hash table 1370 for a cached object. If the file system 169 determines that the time difference 1390 (FIG. 12C) is greater than a pre-selected time value (e.g., a pre-selected time value of about 30 seconds) for which the LRC time value 1374 for a first version 1210*a* of object 1210 is greater than the RST time value 1374 when the subsequent R1 request was made. As discussed above, instead of using the R1 request time value, the time value of request 1215 may be used instead as an RST time value 1374. If the time difference 1390 is greater than the pre-selected time value, then proxy cache 115 will send a request 1380 (FIG. 12*a*) to verify the attributes of object 1210 to determine if object 1210*a* (in the proxy cache 115) is the latest version of the object 1210 (in the server 110). In the example of FIG. 12, the time difference 1390 is measured between LRC time=tw (LRC value 1373 of object 1210*a*) and the RST=tx (RST value 1374 of subsequent request R1). In an embodiment, the fill engine 166 in the proxy cache 115 will send, for example, a GETATTR command to the server 115 to obtain the attributes of object 1210. The attributes permits the proxy cache 115 to verify if the latest version of the object 1210 is stored in the proxy cache, and obtain a newer version of the object 1210 from the server 110 if an older version of the object 1210 is stored in the proxy cache 115. The proxy cache 115 can then server the latest version of the object to the client.

If the time difference 1390 is not greater than the predetermined time value of, e.g. 30 seconds, then the proxy cache 115 can serve the object 1210*a* to the requesting client.

The above method permits data consistency to be achieved for data that is stored in the proxy cache. It is further noted that the hash table 1370 may be cleaned up periodically by the file system 169.

The various engines or modules discussed herein may also be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Aspects of the invention may also be implemented in hardware, software, firmware, and/or a combination of any of hardware, software, or firmware.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to provide data consistency in a storage system, the method comprising:

storing active data from a plurality of servers in a proxy cache based on a demand indicated by a plurality of clients to access data from the plurality of servers, wherein the active data includes a plurality of files and is a subset of data stored in the plurality of servers;

retaining the active data in the proxy cache based on a specific value assigned to each of the plurality of files, wherein the specific value of each particular file is dynamically determined based on a number of access requests made by the plurality of clients for the particular file;

providing, by a server of the plurality of servers to the proxy cache, a lock associated with a delegated file in the server, wherein the server prevents a write operation on the delegated file in the server when the proxy cache has the lock;

in response to a write request from a client of the plurality of clients, modifying, by the proxy cache, data in a cached copy of the delegated file, wherein the cached copy is stored in the proxy cache and wherein the write request modifies the data in the cached copy of the delegated file into a modified data in the cached copy;

revoking, by the server, the lock associated with the delegated file so that the proxy cache provides the lock to the server, in response to a request from another device to access the delegated file in the server, wherein the delegated file is now a formerly delegated file after the proxy cache has provided the lock to the server; and writing the modified data from the proxy cache to the formerly delegated file in the server in order to update the formerly delegated file based upon the write request that modifies the data in the cached copy, when the server has obtained the lock from the proxy cache; and permitting access to the updated formerly delegated file in the server by the another device.

2. The method of claim 1, further comprising:

requesting, by the proxy cache to the server, for the lock associated with the delegated file.

3. The method of claim 1, wherein the modified data written to the formerly delegated file is tagged to indicate transmission of the modified data to the server.

4. The method of claim 1, wherein the modified data that is not yet written to the formerly delegated file is untagged to indicate that no transmission of the modified data to the server.

5. The method of claim 1, wherein the lock prevents another client to modify the delegated file.

6. The method of claim 1, wherein the proxy cache and the server can communicate with each other by use of the NFS version 4 protocol.

7. The method of claim 1, further comprising:

revoking the lock of the proxy cache for the delegated file in response to a request from another client to the server to access the delegated file.

8. The method of claim 1, further comprising:

revoking the lock of the proxy cache for the delegated file in response to a request from another proxy cache to the server to access the delegated file.

9. The method of claim 1, further comprising:

sending modified data of the delegated file to the server after the lock of the proxy cache for the delegated file is revoked.

10. A method to provide data consistency in a storage system, the method comprising:

storing active data from a plurality of servers in a proxy cache based on a demand indicated by a plurality of clients to access data from the plurality of servers, wherein the active data includes a plurality of files and is a subset of data stored in the plurality of servers;

retaining the active data in the proxy cache based on a specific value assigned to each of the plurality of files, wherein the specific value of a particular file is dynamically determined based on a number of access requests made by the plurality of clients for the particular file;

providing, by a server of the plurality of servers to the proxy cache, a lock associated with a delegated file in the server, wherein the server prevents a write operation on the delegated file in the server when the proxy cache has the lock;

in response to a write request from a client of the plurality of clients, modifying, by the proxy cache, data in a cached copy of the delegated file, wherein the cached copy is stored in the proxy cache and wherein the write request modifies the data in the cached copy of the delegated file into a modified data in the cached copy; and writing the modified data from the proxy cache to the delegated file in the server in order to update the delegated file based upon the write request that modifies the data in the cached copy, when the server has obtained the lock from the proxy cache.

11. The method of claim 10, wherein the modified data is written by a deferred write operation.

12. The method of claim 10, wherein the modified data is written by a delayed write operation.

13. The method of claim 10, wherein the proxy cache receives a write request from the client to modify the cached copy of the delegated file while a disconnect operation occurs between the server and the proxy cache.

14. The method of claim 10, further comprising:

requesting, by the proxy cache to the server, for a lock associated with the delegated file.

15. The method of claim 10, wherein the modified data written to the server is tagged to indicate transmission of the modified data to the server.

16. The method of claim 10, wherein the modified data that is not yet written to the server is untagged to indicate that no transmission of the modified data to the server.

17. An apparatus for providing data consistency in a storage system, the apparatus comprising:

a server configured to provide a lock associated with a delegated file in the server;

a proxy cache configured to store active data from the server based on a demand indicated by a client to access data on the server, wherein the proxy cache retains the active data based on a specific value assigned to each of a plurality of files of the active data;

wherein the specific value of each of the plurality of files is determined based on a number of access requests made by the client;

wherein in response to the proxy cache receiving the lock the server prevents a write operation on the delegated file in the server when the proxy cache has the lock;

wherein the client sends a write request to the proxy cache;

wherein the proxy cache modifies data in a cached copy of the delegated file, wherein the cached copy is stored in the proxy cache, in response to a write request from a client and write the modified data to the delegated file in the server to update the delegated file based upon the write request that modifies the data in the cached copy, wherein the modified data is written to the delegated file when the server has obtained the lock from the proxy cache; and wherein the server revokes the lock associated with the delegated file, in response to a request from another device to access the delegated file so that the delegated file is now a formerly delegated file.

18. The apparatus of claim 17, wherein the modified data written to the formerly delegated file is tagged to indicate transmission of the modified data to the server.

19. The apparatus of claim 17, wherein the modified data that is not yet written to the formerly delegated file is untagged to indicate that no transmission of the modified data to the server.

20. The apparatus of claim 17, wherein the lock prevents another client to modify the delegated file.

21. The apparatus of claim 17, wherein the proxy cache and the server can communicate with each other by use of the NFS version 4 protocol.

22. The apparatus of claim 17, wherein the server is configured to revoke the lock of the proxy cache for the delegated file in response to a request from another client to the server to access the delegated file.

23. The apparatus of claim 17, wherein the server is configured to revoke the lock of the proxy cache for the delegated file in response to a request from another proxy cache to the server to access the delegated file.

24. The apparatus of claim 17, wherein the proxy cache is configured to send the modified data of the delegated file to the server after the lock of the proxy cache for the delegated file is revoked.

25. An apparatus for providing data consistency in a storage system, the apparatus comprising:

a server configured to provide a lock associated with a delegated file in the server, wherein server prevents a write operation on the delegated file in the server when the proxy cache has the lock;

a proxy cache configured to store active data from the server based on a demand indicated by a client to access data on the server, wherein the proxy cache retains the active data based on a specific value assigned to each of a plurality of files of the active data, and wherein the specific value of each of the plurality of files is determined based on a number of access requests made by the client, and wherein the proxy cache receives the lock and modifies data in a cached copy of the delegated file in response to a write request from the client, and wherein the cached copy is stored in the proxy cache, and wherein the proxy cache is further configured to write the modified data to the delegated file in the server to update the delegated file based upon the write request that modifies the data in the cached copy, wherein the modified data is written to the delegated file when the server has obtained the lock from the proxy cache.

26. The apparatus of claim 25, wherein the modified data is written by a deferred write operation.

27. The apparatus of claim 25, wherein the modified data is written by a delayed write operation.

28. The apparatus of claim 25, wherein the proxy cache receives a write request from the client to modify the cached copy of the delegated file while a disconnect operation occurs between the server and the proxy cache.

29. The apparatus of claim 25, wherein the proxy cache is configured to request for a lock associated with the delegated file.

30. The apparatus of claim 25, wherein the modified data written to the server is tagged to indicate transmission of the modified data to the server.

31. The apparatus of claim 25, wherein the modified data that is not yet written to the server is untagged to indicate that no transmission of the modified data to the server.

32. The apparatus of claim 17, wherein the proxy cache is configured to request to the server for a lock associated with the delegated file.

33. A method to provide a distributed storage system, the method comprising:
   storing active data from a plurality of storage servers in a proxy cache, wherein the active data is a subset of data stored in the plurality of storage servers, and wherein the active data includes a plurality of data blocks;
   caching the active data in the proxy cache based on a demand indicated by a plurality of clients to access the data from the plurality of storage servers, wherein the plurality of clients communicate with the proxy cache to access the data stored in the plurality of storage servers; and
   retaining the active data in the proxy cache based on a priority value associated with each of the plurality of data blocks, wherein the priority value of a particular data block is assigned by:
      determining whether the particular data block is assigned a predetermined value;
      in response to a determination that the particular data block has a predetermined value, using the predetermined value to assign the priority value for the particular data block; and
      otherwise, using a dynamic value to assign the importance value for the particular data block, wherein the dynamic value is determined based on a number of requests made by the plurality of clients to access the particular data block.

34. The method of claim 33, further comprising:
   requesting a delegation lock for a specific data block in response to a request to the proxy cache from a particular client of the plurality of clients to write to the specific data block;
   enabling the proxy cache to receive the delegation lock for the specific data block from a server of the plurality of storage servers;
   locking the specific data block in the proxy cache after receiving the delegation lock; and
   disallowing write requests to the specific data block until the server revokes the delegation lock to unlock the specific data block.

35. The method of claim 34, further comprising:
   enabling the particular client to modify the specific data block after the proxy cache receives the delegation lock for the specific data block;
   caching modifications to the specific data block by creating a modified data block in the proxy cache; and
   replacing the specific data block in the server with the modified data block from the proxy cache after the server revokes the delegation lock on the specific data block.

* * * * *